US012708582B2

(12) United States Patent
Weingardt et al.

(10) Patent No.: US 12,708,582 B2
(45) Date of Patent: Aug. 18, 2026

(54) SAFETY SYSTEM FOR USE IN MEDICAL TABLES

(71) Applicant: MAQUET GMBH, Rastatt (DE)

(72) Inventors: Markus Stephan Weingardt, Rheinstetten (DE); Rodrigo Del Alcazar Von Buchwald, Waldbronn (DE); Tim Golde, Weingarten (DE); Michael Roskorsch, Rastatt (DE); Immanuel Gaiser, Weisenbach (DE)

(73) Assignee: MAQUET GMBH (DE)

( * ) Notice: Subject to any disclaimer, the term of this patent is extended or adjusted under 35 U.S.C. 154(b) by 0 days.

(21) Appl. No.: 18/711,792

(22) PCT Filed: Oct. 28, 2022

(86) PCT No.: PCT/EP2022/080272
§ 371 (c)(1),
(2) Date: May 20, 2024

(87) PCT Pub. No.: WO2023/088666
PCT Pub. Date: May 25, 2023

(65) Prior Publication Data

US 2025/0017802 A1 Jan. 16, 2025

(30) Foreign Application Priority Data

Nov. 19, 2021 (DE) ..................... 10 2021 130 310.9

(51) Int. Cl.
*A61G 13/12* (2006.01)
*A61G 13/04* (2006.01)

(52) U.S. Cl.
CPC ........... *A61G 13/129* (2013.01); *A61G 13/04* (2013.01); *A61G 13/1285* (2013.01);
(Continued)

(58) Field of Classification Search
CPC .... A61G 13/00; A61G 13/04; A61G 2203/20; A61G 2203/30; A61G 2203/44;
(Continued)

(56) References Cited

U.S. PATENT DOCUMENTS 7,784,126 B2 8/2010 Meissner et al.
8,931,124 B2 1/2015 Daley
(Continued)

FOREIGN PATENT DOCUMENTS

DE 112009004275 T5 9/2012
DE 102015113110 A1 3/2019
(Continued)

OTHER PUBLICATIONS

International Search Report and Written Opinion for PCT/EP2022/080272 mailed Mar. 6, 2023, 6 pages.
(Continued)

*Primary Examiner* — Fredrick C Conley
(74) *Attorney, Agent, or Firm* — FBT Gibbons LLP

(57) ABSTRACT

A system for determining and displaying restrictions on the operation of an operating table, comprising a patient support surface (600) for fastening on an operating table column of an operating table, a display unit (607) for displaying information about restrictions on the operation of the operating table, and an evaluation unit (606) which determines restrictions on the operation of the operating table based on at least the identification and/or configuration of the patient support surface (600) and displays the restrictions on the display unit (607) before the patient is placed on the patient support surface (600).

22 Claims, 14 Drawing Sheets

(52) U.S. Cl.
CPC ...... *A61G 2203/20* (2013.01); *A61G 2203/30* (2013.01); *A61G 2203/44* (2013.01)

(58) Field of Classification Search
CPC .... A61G 2203/70; A61G 13/10; A61G 13/08; A61G 13/129
See application file for complete search history.

(56) References Cited

U.S. PATENT DOCUMENTS

| | | | |
|---|---|---|---|
| 10,314,758 | B2 | 6/2019 | Dolliver et al. |
| 2006/0123546 | A1 | 6/2006 | Horton et al. |
| 2016/0078740 | A1 | 3/2016 | Clementine et al. |
| 2016/0331614 | A1 | 11/2016 | Furman et al. |
| 2017/0027797 | A1* | 2/2017 | Dolliver ............... A61G 13/104 |
| 2017/0151027 | A1* | 6/2017 | Walker ................... A61B 34/37 |
| 2018/0008052 | A1* | 1/2018 | Krickeberg ............ A61G 15/10 |
| 2018/0147104 | A1 | 5/2018 | Timm et al. |
| 2018/0221231 | A1 | 8/2018 | Harlacher et al. |
| 2020/0060916 | A1 | 2/2020 | Inoue et al. |
| 2020/0170869 | A1* | 6/2020 | Kohler ................... A61G 13/06 |
| 2020/0188206 | A1 | 6/2020 | Hempel |
| 2021/0137460 | A1 | 5/2021 | Kohler et al. |
| 2022/0409463 | A1* | 12/2022 | Rempp .................. A61G 13/06 |
| 2024/0016688 | A1* | 1/2024 | Del Alcazar von Buchwald ........ A61G 13/129 |

FOREIGN PATENT DOCUMENTS

| | | | |
|---|---|---|---|
| EP | 2702974 | A2 | 8/2013 |
| EP | 3533431 | A1 | 2/2019 |
| WO | WO 2021/239820 | A1 | 12/2021 |

OTHER PUBLICATIONS

Vanto, The Power in Surgery brochure, “The Vanto Operating System”, 26 pages.

Vanto II, The Power in Surgery catalog, “Operating Table System”, 35 pages.

* cited by examiner

SAFETY SYSTEM FOR USE IN MEDICAL TABLES

The present application claims the priority of German patent application No. 10 2021 130 310.9, which was filed with the German Patent and Trademark Office on 19 Nov. 2021. The disclosure content of German patent application No. 10 2021 130 310.9 is hereby incorporated into the disclosure content of the present application.

TECHNICAL AREA

The present disclosure relates to medical and operating tables in which the table top and/or segments of the table top are movable. In particular, it relates to systems for limiting the movement of the table top and/or the segments based on their characteristics and the patient load, as well as systems for displaying movement limits to users.

BACKGROUND OF THE DISCLOSURE

Operating tables are used to support a patient, for example during a surgical procedure. Currently, due to the flexibility in setting up the operating table, the number of accessories, and the different options for patient positioning offered by the operating table, nurses and doctors have to consider many important aspects in order to use the operating table properly. Some of these aspects are listed below:

- The accessories used are to be matched to the patient's weight.
- The configuration of the accessories is likewise to be matched to the patient's weight.
- The patient support surface on which the patient is located is only to be moved within permitted limits.
- If a movement restriction applies, care is to be taken that the permitted limits are not exceeded at any time.
- When adjusting the operating table, care is to be taken so that the operating table does not collide with an external object, such as a C-arm.
- Furthermore, when adjusting the operating table, care is to be taken so that the patient is correctly secured and does not fall or slip off the operating table.

Important information on the points listed above can be found in the instructions for use of the operating table. If the user ignores the instructions for use or does not pay sufficient attention to collisions and the patient, the following dangerous events may occur:

- Tipping over of the operating table: The patient may fall, which can result in permanent injuries and even death.
- Overloading of structural parts of the accessories and the operating table: This can have the result that structural components permanently bend or break, causing permanent injuries or even death of the patient.
- Overloading of the motorized joints: Causes restricted mobility because the operating table cannot move.
- Collision of the operating table with external object: During movement, the operating table may collide and damage expensive equipment, such as C-arms.
- Falling of the patient: If the patient is not adequately secured, the patient may begin to slip during table movements, which in the worst case can result in the patient falling to the floor.

Patient support surfaces of operating tables can have replaceable, detachably connectable segments. Often some or all of the interchangeable segments are movable. By using different interchangeable segments, a single operating table can be reconfigured in different ways for different patients and methods. However, this means that the size, shape, dimensions, ranges of motion, and strength of the individual tables will be different at different times to ensure the safety of the patient and to take into consideration the mechanical limits of the individual table arrangements. For certain advanced table functions, it is useful for the table control system to know the identity and sequence of the table extensions. It is useful for the table system to be able to automatically detect the identity and sequence of the table extensions, including extensions of the second and third level or stage that are not directly connected to the central patient support segment, which is connected to the table column.

Document US 2017/0027797 A1 discloses a personal support device capable of supporting a patient, wherein the personal support device comprises a control unit capable of communicatively coupling with at least one removable component of the personal support device, wherein the control unit is capable of determining the absence or presence of the at least one removable component and, as a reaction e to determining that the at least one removable component is present or absent, to deactivate or activate at least one movement of the personal support device. The removable components can contain RFID identifiers. The control unit can also communicate with the removable component via wired communication. However, US 2017/0027797 A1 does not disclose a modular operating table system having multiple expansion levels and using the advantageous combination of both wired and RFID communication with different table expansion levels as disclosed here. Nor does it disclose a system that determines and visibly displays the movement restrictions for an operating table configuration before a medical procedure and for an array of different patient weight ranges.

A patient support surface used to support the patient can be of modular design and can have a main support surface section that can be extended by coupling on various secondary support surface sections. For this purpose, the main support surface section and the secondary support surface sections can have mechanical connecting elements, using which the main and secondary support surface sections can be detachably connected. Secondary support surface sections can be, for example, leg or head sections. Furthermore, secondary support surface sections can also be intermediate or extension sections, which are inserted, for example, between the main support surface section and the head section.

When a secondary support surface section is adjusted in its position or extended, the risk of the secondary support surface section colliding with another object is to be as low as possible. The risk of collision depends on, among other things, the type of secondary support surface section. For example, a leg section is longer than a head section and therefore has a different collision risk than a head section. It would therefore be desirable if it could be determined which secondary support surface sections are connected to the main support surface section. This would also make it possible to define restrictions for the operation of the respective secondary support surface sections in order to avoid collisions. For example, depending on the configuration of the patient support surface, i.e., the combination of the main support surface section with the installed secondary support surface sections, the maximum extension distance and/or the maximum adjustment angle of the secondary support surface sections can be specified.

Operators of operating table are responsible for creating the correct configuration of the operating table for the planned procedure during an operation. Some or all of the following criteria may be taken into consideration:

Surgical specialty of the planned operation, weight of the patient, planned and permissible configuration of the operating table including accessories, i.e., the installed secondary support surface sections, permissible load of the secondary support surface sections used and the operating table, and planned movements and positions of the operating table.

It is part of clinical routine to know the weight of the patient and which positions in combination with the operating table configuration a particular procedure requires. On the other hand, memorizing all permissible combinations and loading situations listed in the operating instructions for the operating table and accessories is not part of clinical routine.

In theory, the operator is to study the instructions for use of the operating table and the installed accessories to be sure that the planned procedure can be carried out using the planned table load and configuration. This involves a high level of effort and is therefore disadvantageous.

SUMMARY OF THE DISCLOSURE

It is an object of the present disclosure to provide an operating table having a load sensor arrangement, wherein the load sensor arrangement is advantageously designed to measure a variable from which a load acting on the load sensor arrangement can be determined.

Another object of the present disclosure is to provide an operating table that generates a signal indicating a risk of the operating table tipping over.

Yet another object of the present disclosure is to provide an operating table that generates a signal indicating a risk of overload for the operating table and/or a component of the operating table.

Another object of the present disclosure is to provide a patient support surface for fastening to an operating table column, which makes it possible to determine which secondary support surface sections are connected to the main support surface section of the patient support surface.

Furthermore, a patient support surface is to be created which provides the operator with feedback before the start of the procedure about the limitations to which the operating table having the installed support surface sections is subjected during operation.

According to a first aspect of the present disclosure, an operating table comprises a load sensor arrangement having multiple load sensors. The load sensor arrangement is designed to measure at least one variable, i.e., exactly one or more variables, from which a load acting on the load sensor arrangement can be determined.

The load acting on the load sensor arrangement can in particular comprise all external force variables, i.e., forces and torques, which act on the load sensor arrangement. The load sensors can, for example, be force sensors, in particular load cells, which each measure a force acting on the respective sensor. In such an embodiment, the measured variable can be the force measured by each of the force sensors, i.e., each of the force sensors measures a corresponding variable. The force sensors can each output an electrical signal, for example an electrical voltage, as an output signal, from which the measured force can be derived. Furthermore, it can also be provided that the force sensors each output the specific dimension of the force measured by them, for example in digital form.

It is also conceivable that the load sensor arrangement measures a resulting total force as a variable, wherein the resulting total force results from the individual forces acting on the different force sensors. In this case, the load sensor arrangement can in particular measure exactly one variable, namely the resulting total force. The total force can again be output as an electrical signal, for example as an electrical voltage, from which the measured force can be derived, or as a specific dimension, for example in digital form.

The load acting on the load sensor arrangement comprises, for example, the load caused by the components of the operating table arranged above the load sensor arrangement as well as the load caused by the patient placed on the operating table or other objects located on the operating table. Furthermore, a person can also cause a load on the operating table, for example in that the person stands next to the operating table and supports himself on the operating table with a hand or another part of the body. In addition, external forces generated in other ways can generate a load on the operating table. Such loads can also be measured by the load sensor arrangement.

The load sensor arrangement having the multiple load sensors can be arranged between at least two parts of the operating table. The at least two parts are essentially immobile relative to one another. If the operating table, in particular the patient support surface, is moved or adjusted during operation, for example when tilting and/or extending the patient support surface, the at least two parts essentially do not move relative to one another, i.e., they remain essentially in the same position relative to one another. This applies both to the distance of the at least two parts from one another and to the angle(s) that the at least two parts form with one another.

However, the at least two parts can move very slightly relative to one another to the extent that the load sensors are physically deformed by weight and pressure. Thus, “essentially the same position” includes a relative movement of the at least two parts by up to 3 millimetres due to a temporary, elastic deformation of the load sensors. In an alternative formulation, one could say that the multiple load sensors or the at least two parts are only movable by a maximum of 3 millimeters relative to one another, and/or they are only movable to the extent that the load sensors are physically deformed.

The at least two parts of the operating table can be arranged directly next to or adjacent to the load sensor arrangement. The load sensor arrangement can be in contact with the two parts. For example, the load sensor arrangement can touch each of the two parts. At least during operation of the operating table, the two parts can be firmly connected to the load sensor arrangement. The load sensor arrangement can be arranged at different positions in the operating table. For example, the load sensor arrangement can be integrated into the column of the operating table. In this case, a first side of the load sensor arrangement may be connected to at least a first part of the column, and a second side of the load sensor arrangement, which may in particular be opposite to the first side, may be connected to a second part of the column. The first and second parts of the column are designed such that they are not movable relative to one another. Furthermore, the first part of the column can be arranged above the second part of the column.

Furthermore, the load sensor arrangement can be arranged at or adjacent to interfaces which the column forms with the patient support surface or the stand (or base). Consequently, the load sensor arrangement can be arranged, for example, between the patient support surface and the column. In this case, the first side of the load sensor arrangement can be connected to a part of the patient support surface and the second side of the load sensor arrangement can be connected to a part of the column, wherein the two parts are immovable relative to one another.

Alternatively, the load sensor arrangement can be arranged, for example, between the column and the stand. In this case, the first side of the load sensor arrangement can be connected to a part of the column and the second side of the load sensor arrangement can be connected to a part of the stand, wherein the two parts are immovable relative to one another.

The integration of the load sensors between two or more non-movable structural parts of the operating table has multiple advantages over other solutions, especially solutions in which the load sensors are integrated into joints. For example, it is conceivable that in such solutions the load sensors are integrated into multiple universal joints such that the load sensors are located between multiple, for example three, parts movable relative to one another. Such a solution is not ideal because dynamic effects result in major accuracy problems. In addition, moving parts tend to wear out over time, making the system less reliable and making constant maintenance and calibration necessary. Such problems are reduced or even eliminated by placing the load sensors between at least two structurally non-movable parts.

The load sensor arrangement can be integrated into the operating table such that the complete load flows or is transmitted through the load sensor arrangement. In particular, the load that is caused above the load sensor arrangement can flow through or be transmitted through the load sensor arrangement.

In one embodiment, the load sensors of the load sensor arrangement can be arranged in parallel and in a mirror image to one another. For example, the load sensor arrangement can have a total of four force sensors or load cells. This design has the advantage of increased accuracy and reliability.

Several or all of the load sensors of the load sensor arrangement can be arranged mirror-symmetrically with respect to a first imaginary axis and mirror-symmetrically with respect to a second imaginary axis. The first and second axes can be aligned orthogonally to one another. For example, the first axis can extend parallel to a main axis of the patient support surface, while the second axis extends perpendicular to this main axis but parallel to the patient support surface. In this case, the load sensor arrangement can be located between the patient support surface and the operating table column.

In some designs, the load sensors are arranged in a grid pattern or grid having a large number of load sensors on each "side". In some embodiments, all load sensors are arranged in a common plane. For example, the load sensors can be arranged in a 2×2 grid. The load sensors can, for example, be arranged in a grid arrangement having 2 to 4 load sensors in each dimension.

The mirror-symmetrically arranged load sensors can be aligned in the same direction. In particular, the mirror-symmetrically arranged load sensors can be aligned parallel to one another. The load sensors can each have a main axis that are aligned parallel to one another.

The load sensors of the load sensor arrangement can be identical in design.

In some embodiments, the load sensors have an elongated shape. For example, the load sensors can be rectangular bodies.

In one embodiment, the operating table can have a load determination unit. The load determination unit can be coupled to the load sensor arrangement and receive the measured at least one variable from the load sensor arrangement. Based on the measured at least one variable, the load sensor arrangement can determine at least one of the following loads and/or one of the following centers of gravity:

- a measured load and/or the center of gravity of the measured load;
- an active load and/or the center of gravity of the active load; and
- a total load and/or the center of gravity of the total load.

The load sensor arrangement can, for example, be designed such that it determines either all three of the above-mentioned loads and/or their centers of gravity or a selection of two of the three mentioned loads and/or their centers of gravity or only one of the mentioned loads and/or their centers of gravity.

The measured load is the load that acts on the load sensor arrangement. The measured load corresponds to the load generated by all persons, objects, and forces on the operating table above the load sensors. The measured load corresponds to the load value measured by the load sensor arrangement.

The active load corresponds to the load caused by components not associated with the operating table, and persons and external forces, and which acts on the operating table. Components associated with the operating table are components that are recognized by the operating table, such as the main table surface section and secondary table surface sections fastened on the main table surface section and/or other accessories recognized by the operating table. The influence of the components associated with the operating table is not taken into consideration in the active load. Only the remaining components of the operating table contribute to the active load, i.e., the components not associated with the operating table. These can be, for example, accessories that are not recognized by the operating table. Furthermore, the patient on the operating table contributes to the active load. The active load also includes all external forces acting on the operating table, for example forces exerted on the operating table by persons and/or objects outside the operating table. The total load is the load resulting from the measured load and from a load caused by components associated with the operating table and located below the load sensor arrangement. The total load therefore takes into consideration loads from components that are located below the load sensor arrangement and cannot be measured by the load sensor arrangement and therefore do not contribute to the measured load. The total load is therefore the load resulting from the entire operating table, the patient, the components associated with the operating table, the components not associated with the operating table, and other external forces.

In one embodiment, the operating table can furthermore comprise a safety unit which is coupled to the load determination unit and receives from the load determination unit at least one load value determined by the load determination unit and/or at least one center of gravity determined by the load determination unit. Based on the at least one load and/or the at least one center of gravity, the safety unit can generate a safety signal indicating whether the operating table is in a safety-critical condition. A safety-critical condition exists, for example, if the safety of the patient on the operating table is at risk. For example, this may be the case if there is a risk that the operating table will tip over or be overloaded.

The safety unit can use other parameters to generate the safety signal, such as position data of the operating table, which indicate the position in which the patient support surface is located in particular, pieces of information about recognized accessories, and the weight and center of gravity of the recognized accessories.

The safety unit enables the user of the operating table to be warned when a safety-critical condition occurs in order to ensure the safety of the patient. Furthermore, measures can be taken to avert or prevent the safety-critical condition.

In one embodiment, one or more measures can be taken if the safety unit generates the safety signal such that it indicates a safety-critical condition of the operating table. For example, the operating table can generate an acoustic and/or optical warning signal. Furthermore, a warning signal can be generated in text form, which can be displayed to the user, for example, on a remote control of the operating table. In addition, the movement of the operating table may be restricted. For example, the extension and/or tilting of the patient support surface and/or the movement of the operating table can be slowed down or stopped. In addition, at least one functionality of the operating table can be blocked.

The measures taken can be reduced or canceled when the safety signal indicates a safe condition of the operating table again.

In one embodiment, the safety unit can have a tipping prevention unit which generates a tipping prevention signal based on the total load and/or the center of gravity of the total load, indicating whether there is a risk of the operating table tipping over. The tipping prevention signal is therefore a safety signal of the safety unit.

If there is a risk of tipping, for example, acoustic and/or visual warnings can be generated to the user and/or measures can be taken to prevent the operating table from tipping. For example, movements of the operating table can be blocked or the speed of the operating table can be reduced. In one embodiment, the tipping prevention unit can determine a residual tipping torque for at least one tipping point based on the total load and/or the center of gravity of the total load. Furthermore, the tipping prevention unit compares the determined residual tipping torque to a specified residual tipping torque threshold value and generates the tipping safety signal such that it indicates a tipping risk if the residual tipping torque falls below the residual tipping torque threshold value.

A tipping point is a point or possibly an axis around which the operating table can tilt. For example, a tipping point can be located on a lower side edge of the base that faces toward the floor. Furthermore, a tipping point can be marked by a roller, using which the operating table can be displaced on the floor.

In some embodiments, the tipping points can be defined as all points along the perimeter of a table base or stand that faces toward (and in some cases touches) the floor underneath. For example, all points along the circumference of a rectangular table base can be tipping points. In other embodiments, for example when the stand has a less regular shape, the tipping points can be defined as all points along the edges of a conceptual or imaginary polygon defined by the far corners of a base. For example, in the case of an H-shaped base, the tipping points would be the four corners of the H and the edges of a conceptual rectangle formed by the four corners of the H. Fora round base, every point on the circumference would be a tipping point.

In general, it can be said that the operating table remains stable if the center of gravity of the total load is above a surface delimited by the tipping points. However, if the center of gravity of the total load is not directly above this surface, the operating table will tip over.

The residual tipping torque at a tipping point can be determined by multiplying the distance of the tipping point from the center of gravity of the total load by the total load, wherein the total load is specified as a force. The residual tipping torque is referred to in the English-language literature as the "residual tipping torque". If the determined value for the residual tipping torque is positive, this means that the operating table is stable with respect to this tipping point. If the residual tipping torque is negative, the operating table tips over. The greater the value of the residual tipping torque, the more stable the operating table is. In this embodiment, the residual tipping torque threshold value is specified, which, for example, has a value of 225 Nm. This means that the residual tipping torque is not to be less than 225 Nm. If the residual tipping torque threshold value is not reached, the operating table can warn the user acoustically or visually. Other options are blocking movements or reducing the speed of the operating table.

In one embodiment, the tipping prevention unit can determine a respective residual tipping torque for multiple tipping points, in particular for all possible tipping points. The tipping prevention unit can compare each of these multiple residual tipping torques to the residual tipping torque threshold value. If only one of the tipping torques falls below the residual tipping torque threshold value, the tipping prevention unit can generate the tipping safety signal to indicate a tipping risk. This creates a high level of safety with regard to the tipping of the operating table.

In one embodiment, at least one virtual or imaginary line can be specified which passes through at least one tipping point and which encloses a specified angle, a so-called stability angle, with a specified normal vector, wherein the tipping prevention unit generates the tipping safety signal such that it indicates a tipping risk if the center of gravity of the total load passes through the at least one virtual line. In particular, the tipping safety signal can indicate a tipping risk when the center of gravity of the total load passes through at least one virtual line in a direction in which the residual tipping torque decreases. This embodiment also comprises the case that the virtual line is shifted in parallel and therefore does not pass through the tipping point. In this case, the center of gravity of the total load also has to be shifted accordingly in order to be able to indicate the tipping risk.

The normal vector can, for example, be defined by the vector of the weight force of the operating table if the operating table is on a flat, non-inclined floor. Then the normal vector is aligned perpendicular to the floor surface. The normal vector can also be defined, for example, by the base plate of the stand or the patient support surface in the normal position. Then the normal vector is aligned perpendicular to the base plate of the stand or perpendicular to the patient support surface in the normal position.

In one embodiment, for a plurality of tipping points, in particular for all possible tipping points, at least one virtual or imaginary line can be specified in each case which passes through the respective tipping point and which encloses a specified angle, a so-called stability angle, with the specified normal vector. The multiple virtual lines define a space. As long as the center of gravity of the total load is within this space, there is no risk of the operating table tipping over. Only when the center of gravity of the total load leaves the space defined or bounded by the virtual lines can the operating table tip over. The tipping prevention unit therefore generates the tipping safety signal such that it indicates a tipping risk if the center of gravity of the total load leaves the space defined by the virtual lines.

In one embodiment, the specified stability angle that the virtual or imaginary line through a tipping point encloses with the specified normal vector can depend on the nature of the tipping point. For example, the stability angle can be larger if the tipping point is provided by a roller. In comparison thereto, the stability angle can be smaller if the tipping point does not include a roller but is located, for example, on a lower side edge of the stand.

In one embodiment, a stability angle of 10 degrees can be selected if the tipping point is provided by a roller. For all other tipping points, especially rigid bases or substructures, a stability angle of 5 degrees can be selected.

In some embodiments, the stability angle is at least 2 or at least 5 degrees or is in the range of 5 to 15 degrees or in the range of 3 to 20 degrees. In some designs with retractable wheels or rollers, the stability angle is at least 2 degrees when the operating table is on the floor and at least 8 degrees when it is on wheels or rollers. Certain safety regulations require that medical tables remain stable at an inclination of 5 degrees when placed directly on the floor and at an inclination of 10 degrees when placed on wheels. This technology is useful for meeting such safety regulations, but is not limited to this purpose.

The two embodiments described above, in which the residual tipping torque is compared to the residual tipping torque threshold value or it is checked whether the center of gravity of the total load passes through the at least one virtual line, can be used independently of one another to generate the tipping safety signal. Furthermore, the two methods can also be combined with one another.

In one embodiment, the safety unit can have an overload protection unit which generates an overload protection signal based on a defined load and/or the center of gravity of the defined load. The defined load is a load from the group of measured, active, and total loads. The overload protection signal indicates whether there is a risk of overload for the operating table and/or at least one component of the operating table.

The overload protection signal is a safety signal of the safety unit.

The overload protection unit prevents damage, such as bending or even breaking of a component of the operating table, due to an excessive load acting on the operating table. This also prevents any danger to the patient.

The at least one component of the operating table for which the overload risk is determined may, for example, be a secondary support surface section of the patient support surface or another accessory of the operating table or another component of the operating table, for example a roller or the operating table column.

If there is a risk of overload, for example, acoustic and/or visual warnings can be generated to the user and/or measures can be taken to prevent the overloading of the operating table. For example, movements of the operating table can be blocked or the speed of the operating table can be reduced.

In one embodiment, the overload protection unit can compare the defined load to at least one specified overload threshold value. If the defined load exceeds at least one overload threshold value, the overload protection unit generates the overload protection signal such that it indicates a risk of overload. The at least one overload threshold value may be specific to the operating table and/or the at least one component. Consequently, an individual overload threshold value can be used for each component of the operating table. This makes it possible to determine the overload risk for components of varying stability.

In one embodiment, the operating table can have a patient support surface. The patient support surface is used to support the patient, for example during a surgical procedure. The patient support surface can be of modular design and can have a main support surface section that can be extended by coupling on various secondary support surface sections. For this purpose, the main support surface section and the secondary support surface sections can have mechanical connecting elements with which the main and secondary support surface sections can be detachably connected. Secondary support surface sections can be, for example, leg or head sections. Furthermore, secondary support surface sections can also be extension or intermediate sections, which are inserted, for example, between the main support surface section and the head section.

In one embodiment, the operating table can have a patient support surface with a main support surface section and at least one secondary support surface section. The at least one secondary support surface section can be detachably connected to the main support surface section. In the present embodiment, the at least one secondary support surface section is the at least one component. This design makes it possible to determine a risk of overload for one or more secondary support surface sections. Furthermore, individual overload risks can be specified for several secondary support surface sections and appropriate measures can be taken if overloading is imminent. A secondary support surface section can have an individual load limit. For a configuration made up of multiple interconnected secondary support surface sections, a load limit may exist that differs from the load limits of the individual secondary support surface sections. In particular, the load limit for the configuration made up of interconnected secondary support surface sections may be smaller than the load limit of the individual secondary support surface sections. This circumstance is taken into consideration in one embodiment. For this purpose, an overload threshold value can be specified for the configuration in which the secondary support surface sections are connected to one another and to the main support surface section. The overload protection unit can compare the defined load to the overload threshold value specified for the configuration of the secondary support surface sections and generate the overload protection signal such that it indicates a risk of overload if the defined load exceeds the overload threshold value.

In addition to possible overload risks for individual support surface sections and a configuration of secondary support surface sections, overload risks for specific sections or areas of the patient support surface can also be determined. The areas can, for example, extend along the outer boundaries of the secondary support surface sections. In this case, an area comprises a certain number of secondary support surface sections. However, it is also conceivable that an area boundary does not extend along the outer boundaries of the secondary support surface sections. In this case, one part of a secondary support surface section may belong to one area, while the remaining part of the secondary support surface section belongs to the adjacent area. In one embodiment, at least a part of the patient support surface can therefore be divided virtually or notionally into multiple areas and an overload threshold value can be specified for each area. The overload protection unit checks in which area the center of gravity of the defined load is located and compares the defined load to the overload threshold value specified for this area. If the defined load exceeds the overload threshold value specified for this area, the overload protection unit can generate the overload protection signal such that it indicates a risk of overload.

Furthermore, a graph or curve can be specified which extends along at least one part of the patient support surface. The graph or curve specifies a respective overload threshold value at each point of the at least one part of the patient support surface. The graph or curve can, for example, be a straight line. In particular, the straight line can slope downwards towards a distal end of the patient support surface, so that the overload threshold value becomes less towards the end of the patient support surface. The overload protection unit can check the point at which the center of gravity of the defined load is located on the patient support surface. The formulation "the point on the patient support surface at which the center of gravity of the defined load is located" does not necessarily mean that the center of gravity of the defined load is within the patient support surface. The center of gravity can also be located outside the patient support surface. In this case, the corresponding point on the patient support surface can be determined, for example, by a vertical projection of the center of gravity onto the patient support surface. The overload protection unit compares the defined load to the overload threshold value specified for the determined location and generates the overload protection signal such that it indicates a risk of overload if the defined load exceeds the overload threshold value specified for this location.

In one embodiment, the operating table can have at least one drive. The overload protection unit can determine a load acting on the at least one drive based on the measured load and/or the center of gravity of the measured load and compare the determined load to at least one specified overload threshold value. If the determined load exceeds at least one overload threshold value, the overload protection unit can generate the overload protection signal such that it indicates a risk of overload. This can prevent overloading of the drive.

The drive can in particular be an electric drive which is used, for example, to adjust the patient support surface or individual components of the patient support surface, in particular to extend or tilt the patient support surface. The operating table can also comprise multiple drives. For each of the drives, an individual overload threshold value can be specified that is specific to the respective drive. This makes it possible to specify individual overload risks for the drives.

According to a second aspect of the present disclosure, a method for operating an operating table is provided. A load sensor arrangement of the operating table comprises multiple load sensors and measures at least one variable from which a load acting on the load sensor arrangement can be determined. The load sensor arrangement is arranged between at least two parts of the operating table. The at least two parts are essentially immobile relative to one another.

The method according to the second aspect can have all the embodiments described in the present disclosure in connection with the operating table according to the first aspect.

According to a third aspect of the present disclosure, an operating table comprises a load sensor arrangement having multiple load sensors, a load determination unit, and a tipping prevention unit.

The load sensor arrangement having the multiple load sensors is used to measure at least one variable from which a load acting on the load sensor arrangement can be determined. The load determination unit is coupled to the load sensor unit and determines a total load and/or the center of gravity of the total load based on the measured at least one variable. The total load results from the load acting on the load sensor arrangement and from a load caused by components that are associated with the operating table and are located below the load sensor arrangement. The tipping prevention unit generates a tipping prevention signal based on the total load and/or the center of gravity of the total load, indicating whether there is a risk of the operating table tipping over.

The operating table and its components according to the third aspect can have all the embodiments described in the present disclosure in connection with the operating table and its components according to the first aspect.

If the tipping prevention unit generates the tipping prevention safety signal such that it indicates a risk of the operating table tipping over, the operating table in one embodiment can generate an acoustic and/or optical warning signal and/or a warning signal in text form and/or a movement of the operating table can be slowed down or stopped and/or at least one functionality of the operating table can be blocked.

In one embodiment, the tipping prevention unit can determine a residual tipping torque for at least one tipping point based on the total load and/or the center of gravity of the total load and compare the residual tipping torque to a specified residual tipping torque threshold value. If the residual tipping torque falls below the residual tipping torque threshold value, the tipping safety signal is generated such that it indicates a risk of tipping.

In one embodiment, the tipping prevention unit can determine the residual tipping torque at the at least one tipping point in that the tipping prevention unit multiplies the distance of the at least one tipping point from the center of gravity of the total load by the total load.

In one embodiment, the tipping prevention unit can determine a respective residual tipping torque for a multiple tipping points, in particular for all possible tipping points, and compare each of the residual tipping torques to the specified residual tipping torque threshold value. If at least one of the residual tipping torques falls below the residual tipping torque threshold value, the tipping prevention unit can generate the tipping safety signal such that it indicates a risk of tipping.

In one embodiment, at least one virtual line can be specified which passes through at least one tipping point and which encloses a specified angle, a so-called stability angle, with a specified normal vector. The tipping prevention unit can generate the tipping safety signal such that it indicates a tipping risk if the center of gravity of the total load passes through the at least one virtual line.

In one embodiment, multiple virtual lines can be specified, each of which passes through a tipping point and each of which encloses a specified angle, a so-called stability angle, with the specified normal vector. The multiple virtual lines can define a space. The tipping prevention unit generates the tipping safety signal such that it indicates a tipping risk if the center of gravity of the total load leaves the space defined by the multiple virtual lines.

In one embodiment, the specified stability angle that a virtual line through a tipping point encloses with the specified normal vector can depend on the nature of the tipping point.

In one embodiment, the stability angle can be larger if the tipping point is provided by a roller. The stability angle can be smaller if the tipping point does not have a roller.

According to a fourth aspect of the present disclosure, a method for operating an operating table is provided. A load sensor arrangement of the operating table comprising multiple load sensors measures at least one variable from which a load acting on the load sensor arrangement can be determined. Based on the measured at least one variable, a total load, resulting from the load acting on the load sensor arrangement and from a load caused by components that are associated with the operating table and are located below the load sensor arrangement, and/or the center of gravity of the total load is determined. Furthermore, a tipping prevention signal is generated based on the total load and/or the center of gravity of the total load, indicating whether there is a risk of the operating table tipping over.

The method according to the fourth aspect can have all the embodiments described in the present disclosure in connection with the operating table according to the first aspect and the operating table according to the third aspect.

According to a fifth aspect of the present disclosure, an operating table comprises a load sensor arrangement having multiple load sensors, a load determination unit, and an overload prevention unit.

The load sensor arrangement having the multiple load sensors is used to measure at least one variable from which a load acting on the load sensor arrangement can be determined. The load determination unit is coupled to the load sensor unit and determines at least one defined load, which can be the above-defined measured load, active load or total load, and/or the center of gravity of the defined load, based on the measured at least one variable. The overload protection unit generates an overload protection signal based on the defined load and/or the center of gravity of the defined load, which indicates whether there is a risk of overload for the operating table and/or at least one component of the operating table.

The operating table and its components according to the fifth aspect can have all the embodiments described in the present disclosure in connection with the operating table and its components according to the first aspect.

If the overload protection unit generates the overload protection signal such that it indicates a risk of overload for the operating table and/or the at least one component of the operating table, in one embodiment an acoustic and/or optical warning signal and/or a warning signal in text form can be generated and/or a movement of the operating table can be slowed down or stopped and/or at least one functionality of the operating table can be blocked.

In one embodiment, the overload protection unit can compare the defined load to at least one specified overload threshold value and generate the overload protection signal such that it indicates a risk of overload if the defined load exceeds the at least one overload threshold value. The at least one overload threshold value may be specific to the operating table and/or the at least one component.

In one embodiment, the operating table can have a patient support surface having a main support surface section and at least one secondary support surface section which is detachably connected to the main support surface section, wherein the at least one component is the at least one secondary support surface section.

In one embodiment, the patient support surface can have multiple secondary support surface sections, wherein an overload threshold value is specified for the configuration in which the secondary support surface sections are connected to one another and to the main support surface section. The overload protection unit can compare the defined load to the overload threshold value specified for the configuration of the secondary support surface sections and generate the overload protection signal such that it indicates a risk of overload if the defined load exceeds the overload threshold value.

In one embodiment, at least a part of the patient support surface can be divided virtually into multiple areas and an overload threshold value can be specified for each area. The overload protection unit can check in which area the center of gravity of the defined load is located and compare the defined load to the overload threshold value specified for this area. The overload protection unit can generate the overload protection signal such that it indicates a risk of overload if the defined load exceeds the overload threshold value specified for this area.

In one embodiment, a respective overload threshold value can be specified for each point of at least a part of the patient support surface. The overload protection unit can check the point at which the center of gravity of the defined load is located on the patient support surface and compare the defined load to the overload threshold value specified for this point. The overload protection unit can generate the overload protection signal such that it indicates a risk of overload if the defined load exceeds the overload threshold value specified for this point.

In one embodiment, the operating table can have at least one drive. The overload protection unit can determine a load acting on the at least one drive based on the measured load and/or the center of gravity of the measured load and compare the determined load to at least one specified overload threshold value. The overload protection signal can be generated such that it indicates a risk of overload if the determined load exceeds the at least one overload threshold value.

According to a sixth aspect of the present disclosure, a method for operating an operating table is provided. A load sensor arrangement of the operating table comprising multiple load sensors measures at least one variable from which a load acting on the load sensor arrangement can be determined. Based on the measured at least one variable, at least one defined load, which can be the measured load, active load or total load defined above, and/or the center of gravity of the defined load are determined. An overload protection signal is generated based on the defined load and/or the center of gravity of the defined load, which indicates whether there is a risk of overload for the operating table and/or at least one component of the operating table.

The method according to the sixth aspect can have all the embodiments described in the present disclosure in connection with the operating table according to the first aspect and the operating table according to the fifth aspect.

According to a seventh aspect of the present disclosure, a patient support surface comprises a main support surface section and one or more secondary support surface sections that can be detachably connected to the main support surface section. The main support surface section, which can also be referred to as the middle support surface section, has an interface for coupling the patient support surface to an operating table column.

The patient support surface is designed such that, if at least one of the secondary support surface sections is connected to the main support surface section, at least one piece of information, i.e., one or more pieces of information, is transmitted via an interface between the at least one secondary support surface section and the main support surface section.

Since the at least one secondary support surface section has an interface with the main support surface section, the at least one secondary support surface section is directly connected to the main support surface section. One or more other secondary support surface sections can be coupled to the at least one secondary support surface section and thus indirectly connected to the main support surface section.

The at least one piece of information relates to the at least one secondary support surface section that is directly connected to the main support surface section and/or to one or more other secondary support surface sections that are indirectly connected to the main support surface section. The at least one piece of information can describe or characterize in more detail the respective secondary support surface section to which it refers. For example, the at least one piece of information can indicate the nature or the type of the respective secondary support surface section, i.e., the at least one piece of information can indicate whether it is, for example, a head, leg, or intermediate section. Furthermore, pieces of information about the functions of the respective secondary support surface section, e.g., adjustment and extension options, and/or the dimensions of the secondary support surface section, in particular in the fully retracted and/or fully extended state, can be included in the at least one piece of information.

The at least one piece of information is transmitted in the direction of the main support surface section. If multiple secondary support surface sections are arranged one behind another, e.g., one or more intermediate sections and a leg or head section, the pieces of information can be transmitted successively from the outer secondary support surface sections to the further inward secondary support surface sections and finally from the secondary support surface section directly connected to the main support surface section to the main support surface section. Thus, the main support surface section can receive the respective pieces of information from all secondary support surface sections that are directly or indirectly connected thereto. The main support surface section or a unit integrated into the main support surface section can use the pieces of information, for example, to determine which secondary support surface sections are connected to the main support surface section. Furthermore, it can be determined, for example, in which order or configuration the secondary support surface sections are connected to the main support surface section. In some embodiments, pieces of information about a first secondary support surface section that is not directly connected to the main support surface section are transmitted to the main support surface section via at least one second secondary support surface section that is directly connected to the main support surface section.

The at least one piece of information is preferably transmitted by means of electrical signals via an interface between the at least one secondary support surface section, which can be an intermediate section, and the main support surface section. The electrical signals can be electrical current and/or voltage signals. The electrical signals can be transmitted via the interface in a wired manner, in particular via a wire, i.e., the electrical signals which are transmitted from the at least one secondary support surface section to the main support surface section located directly adjacent thereto are in particular not radio signals which are transmitted via an air interface.

In one embodiment, at least a part of the secondary support surface sections can be movable and/or extendable.

The secondary support surface sections can each be designed either as an intermediate section or as an end section. An intermediate section is a secondary support surface section that can be arranged between the main support surface section and another secondary support surface section or between two other secondary support surface sections. Intermediate sections are also called level N−1 or level N−2 support sections. Intermediate sections can be, for example, shoulder sections used to support a shoulder of a patient, or extension sections.

An end section is a final section that is arranged last in a series of support sections. An end section can therefore be coupled to the main support surface section or an intermediate section. End sections are also called level N support surface sections. End sections can, for example, be head or leg sections that are used to support the head or a leg of a patient.

In one embodiment, the at least one secondary support surface section, which has the interface with the main support surface section, can be an intermediate section. The intermediate section can have a first side and a second side, in particular opposite to the first side. On its first side, the intermediate section can be connected to the main support surface section and on its second side it can be connected to another intermediate section or an end section. The first side can be arranged such that it faces away from the main support surface section. Pieces of information relating to the further intermediate section and/or the end section can be transmitted to the main support surface section by means of the electrical signals after these pieces of information have been transmitted from the further intermediate section or the end section to the intermediate section directly connected to the main support surface section. Furthermore, pieces of information relating to the intermediate section directly connected to the main support surface section can also be fed to the main support surface section by means of the electrical signals. In this way, all pieces of information relating to the intermediate and end sections directly or indirectly connected thereto can be fed to the main support surface section.

In one embodiment, the intermediate section can have an electrical contact unit on the first side for electrical coupling to the main support surface section and a further electrical contact unit on the second side for electrical coupling to the further intermediate section or the end section. By means of the electrical contact unit attached to the first side, the electrical signals can be guided to the main support surface section and by means of the further electrical contact unit, the intermediate section can receive electrical signals from a further intermediate section or, if provided, also from an end section. If only the main support surface section has a power supply, the power supply of the intermediate section and in particular the secondary support surface sections downstream of the intermediate section can be provided via the electrical contact units.

The electrical contact units can each have one or more contact elements or contacts, such as pin contacts or spring contact pins.

If two intermediate sections are connected in series to the main support surface section, the electrical contact unit attached to the first side of the first intermediate section can be electrically coupled to the main support surface section and the electrical contact unit arranged on the second side of the first intermediate section can be electrically coupled to the electrical contact unit arranged on the first side of the second intermediate section.

In one embodiment, the main support surface section can have an electrical contact unit for electrical coupling to the electrical contact unit of the intermediate section attached to the first side of the first intermediate section. The interface between the main support surface section and the intermediate section can be designed such that when the main support surface section and the intermediate section are connected to one another, the electrical contact units of the two sections touch one another and are thus in electrical contact with one another.

Each intermediate section can have on its first side a first connecting element for detachable mechanical connection to the main support surface section or to another intermediate section, and on its second side a second connecting element for detachable mechanical connection to another intermediate section or to an end section. Furthermore, an intermediate section can also have a third connecting element in order to be able to connect another secondary support surface section to the intermediate section. The mechanical or structural connecting elements can establish a strong and resilient connection between the support surface sections.

Each end section can have a connecting element on one side only for detachable mechanical connection to the main support surface section or an intermediate section.

In one embodiment, the connecting elements can be designed as male or female pluggable assemblies, wherein the male assemblies fastened to a support surface section can be plugged into complementary receiving openings of the female assemblies on another support surface section or on a main support surface section. The male assemblies can be, for example, pins, studs, or plug assemblies and the female assemblies can have a complementary embodiment, for example a socket assembly, a concave space, or an empty interior.

Locking elements, which are arranged in particular in the male assemblies, can be moved between a release position and a locking position and secure the mechanical connection of two support surface sections against unintentional separation.

In one embodiment, exactly two male assemblies and exactly two complementary female assemblies can be provided for the connection between two support surface sections, wherein the two male assemblies are fastened to the one support surface section and the two female assemblies are arranged on the other support surface section. A different number of male and female assemblies for establishing the connection between two support surface sections is also conceivable.

Conventional transmitter-receiver systems can be used for radio transmission; for example, RFID technology (radio-frequency identification) can be used. The coupling can be established by alternating magnetic fields generated by an RFID reader within a short range or by high-frequency radio waves. Therefore, not only can data be transmitted, but an RFID transponder can also be supplied with energy. In some embodiments, the RFID transponders and readers are configured to communicate at a frequency of approximately 125 kHz, for example at a frequency between 110 kHz and 170 kHz. Active reader/passive tag RFID systems can be used, which is advantageous for “backward compatibility” with older table extensions, which often include passive RFID transponders. In some embodiments, the RFID reader only generates energy for a passive RFID tag and does not supply energy to operate motors or additional RFID readers.

Furthermore, the first electrical contact unit can be at least partially housed in a watertight sealed element at the distal end of the male assembly. The watertight sealed element can be spring loaded as described above to ensure electrical contact with the second electrical contact unit. The watertightness allows the intermediate section to be washed with water or other suitable liquids.

In one embodiment, the intermediate section can have on its second side a third radio transmission unit, in particular an RFID reader, for receiving radio transmissions from the further intermediate section or the end section. In this case, the further intermediate section or the end section can have a fourth radio transmission unit, in particular an RFID transponder. The patient support surface can be designed such that it passes on pieces of information transmitted by the fourth radio transmission unit and received by the third radio transmission unit from the intermediate section to the main support surface section by means of the electrical signals via the interface between the intermediate section and the main support surface section.

In one embodiment, the end section has no electrical contact unit. In this case, the pieces of information can only be transmitted from the end section to the intermediate section and then to the main support surface section by means of the fourth radio transmission unit.

Alternatively, it can be provided that the end section has an electrical contact unit for electrical coupling to the electrical contact units of the main support surface section or the intermediate section in order to be able to transmit the pieces of information from the end section to the main support surface section.

In one embodiment, the intermediate section can have a female assembly on its second side, in which the male assembly of the further intermediate section is receivable in order to establish a detachable connection between the two intermediate sections. Furthermore, an end section can also have a male assembly that can be received by the female assembly on the second side of the intermediate section.

In one embodiment, the intermediate section can have a control unit which makes it possible to transmit the at least one piece of information to the main support surface section. The control unit can, for example, be an electronic assembly. The control unit can obtain the electrical power supply from the main support surface section.

In one embodiment, the secondary support surface sections can each have a storage unit in which the at least one piece of information about the respective secondary support surface section is stored. The at least one piece of information can be read from the storage unit during operation of the patient support surface and transmitted to the main support surface section.

In one embodiment, an evaluation unit can be provided which is integrated into the main support surface section and is used to evaluate the at least one piece of information transmitted to the main support surface section by means of the electrical signals. In particular, the evaluation unit can determine which secondary support surface sections are connected to the main support surface section. Furthermore, the evaluation unit can determine the order in which the one or more secondary support surface sections are arranged. For example, the result determined by the evaluation unit can be displayed on a display unit, such as a display.

In one embodiment, the evaluation unit can be arranged not within the patient support surface, but outside the patient support surface. The patient support surface can have an interface via which data can be exchanged with the evaluation unit. The patient support surface can communicate with the evaluation unit via radio or in a wired manner.

According to an eighth aspect of the present disclosure, an operating table comprises an operating table column and a patient support surface according to the seventh aspect. The patient support surface can be fastened on the operating table column using its interface provided for this purpose.

According to a ninth aspect of the present disclosure, a main support surface section is provided for detachable connection to one or more secondary support surface sections of a patient support surface. The main support surface section is designed to receive at least one piece of information when the main support surface section is connected to a secondary support surface section. The at least one piece of information relates to the secondary support surface section and/or one or more other secondary support surface sections connected to the secondary support surface section and is transmitted by means of electrical signals via an interface between the main support surface section and the secondary support surface section.

According to a tenth aspect of the present disclosure, a secondary support surface section is provided for detachable connection to a main support surface section and/or one or more further secondary support surface sections of a patient support surface. The secondary support surface section can be designed according to the disclosure and can in particular be an intermediate section. When the secondary support surface section is connected to a main support surface section, the secondary support surface section transmits at least one piece of information relating to the secondary support surface section and/or one or more other secondary support surface sections connected to the secondary support surface section by means of electrical signals via an interface between the secondary support surface section and the main support surface section.

According to an eleventh aspect of the present disclosure, a method for operating a patient support surface is specified. The patient support surface is fastened an operating table column and comprises a main support surface section and at least one secondary support surface section which is detachably connected to the main support surface section. According to the method, at least one piece of information relating to the at least one secondary support surface section and/or one or more other secondary support surface sections connected to the at least one secondary support surface section is transmitted by means of electrical signals via an interface between the at least one secondary support surface section and the main support surface section.

The operating table according to the eighth aspect, the main support surface section according to the ninth aspect, the secondary support surface section according to the tenth aspect, and the method according to the eleventh aspect can have all the embodiments described in the present disclosure in connection with the patient support surface according to the seventh aspect.

The twelfth aspect of the present disclosure relates to a system for advanced determination and display of restrictions on the operation of an operating table. The system comprises a patient support surface which can in particular be fixedly, i.e., permanently, or detachably fastened on an operating table column of an operating table. Furthermore, the system has a display unit on which pieces of information about restrictions on the operation of the operating table can be displayed. In addition, an evaluation unit is provided which determines restrictions on the operation of the operating table based on at least the identification and/or configuration of the patient support surface. The display unit displays the restrictions determined by the evaluation unit. The restrictions are displayed on the display unit before the patient is placed on the patient support surface. The identification of the support surface areas can refer to different subareas of the patient support surface, which can be detachably or also fixedly connected to one another. For example, a patient support surface can comprise head, leg, arm, and intermediate areas as well as other suitable subareas. Through the identification it can be known which subareas the patient support surface comprises. The configuration can, for example, specify in which configuration or order or position the individual subareas are arranged.

In one embodiment, the patient support surface comprises a main support surface section and one or more secondary support surface sections. The main support surface section is provided with an interface for coupling to the operating table column. The main support surface section can be fixedly or permanently or detachably coupled to the operating table column via the interface. The one or more secondary support surface sections can be detachably connected to the main support surface section. If at least one of the secondary support surface sections is connected to the main support surface section, signals are transmitted from the at least one secondary support surface section to the main support surface section. The signals can be, for example, electrical, radio, RFID, or optical signals, or signals of other types. These can, for example, be electrical and/or radio signal arrangements as described above. Based on the signals transmitted to the main support surface section, the evaluation unit determines which secondary support surface sections, i.e., which subareas, are connected to the main support surface section and, in particular, in which order or configuration or position the secondary support surface sections are arranged. The evaluation unit uses the finding, i.e., the knowledge of which secondary support surface sections are connected to the main support surface section and optionally in which order or configuration or position, to generate pieces of information about restrictions or limitations in the operation of the operating table.

The restrictions can, for example, relate to the mobility of the patient support surface and in particular to the adjustability and extendability of the secondary support surface sections. They can also or instead be limitations with respect to the lengthwise displaceability, i.e., the longitudinal displaceability, of the patient support surface and/or with respect to the extent of the Trendelenburg inclination of the patient support surface. Depending on which secondary support surface sections are connected to the main support surface section, other restrictions may arise regarding the adjustability and extendability of the secondary support surface sections. The restrictions with respect to the mobility of the patient support surface can relate to the movement of the entire patient support surface and/or to the separate movement of the secondary support surface sections.

In some embodiments, different patient support surfaces or types of patient support surfaces can be provided that are compatible with one or more operating table columns and can accordingly be fastened on these operating table columns. Each of the different patient support surfaces or types of patient support surfaces can have individual restrictions apply, meaning that different restrictions apply to the different patient support surfaces.

In some embodiments, the restrictions relate to the maximum weight that a patient can have in order to be allowed to be placed on the patient support surface. Patients with a higher weight must not be placed on the patient support surface in the selected configuration.

The pieces of information generated by the evaluation unit and displayed on the display unit inform the operator of the patient support surface about the restrictions to which the patient support surface is subject during operation. This saves the operator the time-consuming task of studying the operating instructions for the patient support surface.

Furthermore, the evaluation unit can also be designed such that it generates and/or monitors the restrictions of the patient support surface based on the knowledge of which secondary support surface sections are connected to the main support surface section. In this case, the evaluation unit has pieces of information about which restrictions the patient support surface is subject to in which configuration of the secondary support surface sections. During operation of the patient support surface, the evaluation unit can control the individual components of the patient support surface such that the restrictions are observed, for example such that certain support surface sections are not extended further than is permitted for the corresponding configuration.

The restrictions can also depend on the weight of the patient. For example, the pieces of information generated by the evaluation unit can specify the restrictions depending on the weight of the patient. In particular, the restrictions can be specified for a plurality of different weight ranges, e.g., for a patient weight below 155 kg, a patient weight between 155 kg and 250 kg, a patient weight between 250 kg and 380 kg, and a patient weight above 380 kg. In some embodiments, the restrictions for an identified table configuration may be specified or displayed for a variety of different weight ranges without the table or the evaluation unit knowing or needing to know the weight of the patient and/or before the patient is positioned on the patient support surface. In some embodiments, the movement restrictions of the table are automatically selected and/or adjusted by the table depending on the type and arrangement of the subsections or secondary support surface sections of the support surface recognized by the table. In some embodiments, the weight ranges are automatically selected and/or adjusted by the table depending on the type and arrangement of the subsections or secondary support surface sections of the support surface recognized by the table.

In another embodiment, the weight of the patient is communicated to the table system before the procedure. For example, pieces of weight information for an expected patient (such as the actual weight, the estimated weight, and/or a weight range or multiple weights) can be entered by a user or provided by an external digital system having pieces of patient information. A single set of restrictions can then be determined and displayed based on the type and layout of the secondary support surface sections and the weight specifications for the expected patient. The restrictions can be ascertained and displayed before the patient is actually on the table.

In one embodiment, the restrictions in operation of the operating table can comprise one or more of the following restrictions:

- Restrictions on the use of secondary support surface sections; for example, certain secondary support surface sections cannot be used due to the patient weight;
- Restrictions on the configuration of secondary support surface sections; for example, certain secondary support surface sections may not be combined with each other, for example, three intermediate sections arranged one behind the other may not be permitted;
- Restrictions on the selection of axes around which movement of the secondary support surface sections is possible; for example, movement of the secondary support surface sections cannot be carried out around certain axes;
- Restrictions on the range or path or distance within which a secondary support surface section is movable around an axis;
- Restrictions on the speed at which a secondary support surface section is movable around an axis;
- Restrictions on the maximum weight of the patient to be allowed to be placed on the patient support surface;
- Restrictions on the longitudinal displacement of the patient support surface;
- Restrictions on Trendelenburg tilting or inclination of the patient support surface;
- Restrictions on lateral inclination or tilting of the patient support surface;
- Restrictions on the height adjustment of the patient support surface;
- Restrictions on extending the rollers of the operating table;
- Restrictions on motorized transport of the operating table; and/or
- Restrictions on the lateral displacement of the patient support surface.

The system according to the twelfth aspect can have all the configurations described in the present disclosure in connection with the patient support surface according to the seventh aspect. In particular, the signals transmitted from the at least one secondary support surface section to the main support surface section can be electrical signals by means of which at least one piece of information relating to the at least one secondary support surface section and/or one or more other secondary support surface sections connected to the at least one secondary support surface section is transmitted via an interface between the at least one secondary support surface section and the main support surface section.

In one embodiment, the at least one secondary support surface section is an intermediate section which is connected on a first side to the main support surface section and on a second side to a further intermediate section or an end section. The at least one piece of information relating to the further intermediate section or the end section can be transmitted to the main support surface section by means of the electrical signals via the intermediate section directly connected to the main support surface section on its first side.

The system can use pieces of information transmitted from the intermediate section about another intermediate section or an end section to identify the another intermediate section or the end section.

In one embodiment, one or more intermediate sections can each have a control unit which makes it possible to transmit the pieces of information to the main support surface section. The control unit can, for example, be an electronic assembly. The control unit can obtain the electrical power supply from the main support surface section.

In one embodiment, the secondary support surface sections can each have a storage unit in which the at least one piece of information about the respective secondary support surface section is stored. The at least one piece of information can be read from the storage unit during operation of the system and transmitted to the main support surface section.

In one embodiment, pieces of information about the restrictions on the operation of the operating table are displayed by the display unit in text form and/or graphically. This allows the operating table operator to easily comprehend the restrictions.

The display unit can be integrated into a component of the system, for example a remote control of the operating table, in the form of a display. The remote control can also display other pieces of information about the patient support surface or a table arrangement having the patient support surface. The remote control can also receive inputs and commands from an operator to control the patient support surface or a table arrangement having the patient support surface. The display unit can also be a multi-purpose monitor or display screen for the operating room. The display unit can, for example, be a monitor or display screen mounted on a ceiling suspension arm or on a wall of an operating room or another medical room. The same monitor or display screen can also be used to display other pieces of information relevant to an integrated operating room (for example, videos, vital signs of the patient, and/or information about lights, tables, and other medical equipment). It is also conceivable to integrate the display unit into the patient support surface.

In one embodiment, the system comprises an input unit into which the operator can enter the weight of a patient supported or to be supported on the operating table. The input unit can, for example, be provided on the patient support surface, on a table column supporting the patient support surface, on a remote control (as described above) which optionally also displays the restrictions, or in conjunction with a multi-purpose operating room monitor or display screen (as described above). Additionally or alternatively, the system can have an interface for receiving pieces of electronic patient weight information from outside the system.

In one embodiment, a load determination unit can be integrated into the system, which determines the load acting on the patient support surface and in particular the weight of the patient supported on the patient support surface. The load determination unit can be fully or partially integrated into a table column and/or the patient support surface and/or other components of the operating table. For example, the load determination units described in this application or other load determination units can be used as the load determination unit.

In one embodiment, in addition to the pieces of information about identification and/or configuration of the patient support surface, the evaluation unit also uses the weight of the patient entered into the input unit and/or received via the interface and/or the load determined by the load determination unit to generate the information about restrictions on the operation of the operating table. With the aid of the information about the weight of the patient or the load acting on the patient support surface, the evaluation unit can provide the operator with more specific pieces of information about the restrictions during operation of the operating table. Additionally or alternatively, the evaluation unit can automatically limit movements of the entire patient support surface and/or the individual support surface subareas or sections based on the pieces of information on the patient weight and/or the load acting on the patient support in combination with the pieces of information on the identity and position of the support surface subareas.

In one embodiment, the main support surface section can contain at least one light source which is used to generate light and at least one detector element using which light can be detected.

The one or more secondary support surface sections can each contain one or more light guides and one marking element. The marking elements change light incident on the marking elements in a manner specific to the respective secondary support surface section. If at least a part of the secondary support surface sections, i.e., one or more of the available secondary support surface sections, are connected to the main support surface section, the light generated by the at least one light source is guided by means of the light guides in the secondary support surface sections to the marking elements of the secondary support surface sections connected to the main support surface section and from the marking elements to the at least one detector element.

The signals, which are transmitted from the at least one secondary support surface section to the main support surface section and on the basis of which the evaluation unit determines which secondary support surface sections are connected to the main support surface section, comprise the light generated by the at least one light source, which is guided by means of the light guides to the marking elements of the secondary support surface sections connected to the main support surface section and from the marking elements to the at least one detector element.

Since the marking elements change the light in a manner specific to the respective secondary support surface section, the evaluation unit can deduce from the light returned by the marking elements to the at least one detector element and detected by the at least one detector element which secondary support surface sections and in particular in which order or configuration the secondary support surface sections are connected to the main support surface section.

To detect the secondary support surface sections connected to the main support surface section, it is not necessary to integrate electronic assemblies into the secondary support surface sections.

The marking elements can be used to detect the secondary support surface sections connected to the main support surface section. To do this, the marking elements change the light incident thereon in a way that is specific to the respective secondary support surface section. In one embodiment, the marking elements can change the spectral light characteristics of the incident light. For example, the marking elements can only allow light in a certain wavelength range to pass through. The wavelength range that is transmitted by a particular marking element is specific to the respective secondary support surface section. In one embodiment, the at least one light source can generate white light and the marking elements can be optical filters that only allow light of a specific color or a specific wavelength range to pass through. For example, the marking elements can each allow red, green, or blue light to pass through. Based on the wavelength ranges detected by the at least one detector element, it can be determined which secondary support surface sections are connected to the main support surface section.

Instead of the wavelength, the marking elements can also select the incident light according to other criteria, for example according to the polarization state. In one embodiment, the marking elements can each only let light having a certain polarization state or a certain polarization direction pass through. Based on the polarization state of the detected light, the evaluation unit can determine which secondary support surface sections are coupled to the main support surface section.

In one embodiment, secondary support surface sections of the same type can have marking elements that change the light in the same way. For example, leg sections and head sections can each contain marking elements that act on the incident light in the same way. This makes it possible to distinguish leg and head sections from one another.

The marking elements can be designed such that the light generated by the at least one light source passes through them. The marking elements can be designed such that they reflect the light generated by the at least one light source.

The marking elements can be integrated into one of the light guides in the respective secondary support surface section or can be arranged at one end of a light guide. Furthermore, the marking elements can be integrated into another optical component, for example a beam splitter, or can be arranged adjacent to the optical component.

In one embodiment, the at least one light source can emit light in the visible, infrared, and/or ultraviolet range. In one embodiment, the at least one light source can emit white light. The at least one light source can be designed as one or more light-emitting diodes.

In one embodiment, the at least one detector element can contain multiple photodiodes, each of which detects light of different wavelength ranges. For example, one photodiode can be designed to detect red light, another photodiode to detect green light, and yet another photodiode to detect blue light.

German patent application No. 10 2020 114 190.4, which was filed with the German Patent and Trademark Office on 27 May 2020, describes further embodiments of a patient support surface which can determine with the aid of optical signals which secondary support surface sections are connected to the main support surface section. The content of the disclosure of German patent application No. 10 2020 114 190.4 is hereby incorporated in its entirety into the content of the disclosure of the present application.

According to a thirteenth aspect of the present disclosure, an operating table system comprises an operating table having an operating table column and a system according to the twelfth aspect. The patient support surface of the system is detachably or permanently fastened on the operating table column.

In one embodiment, the operating table system may comprise a load sensor arrangement having multiple load sensors for measuring at least one variable. A load acting on the load sensor arrangement can be determined from the at least one variable. The load sensor arrangement can be arranged between at least two parts of the operating table, wherein the at least two parts are essentially immovable relative to one another. The described embodiment may have all the embodiments described in the present disclosure in connection with the operating table according to the first aspect.

According to a fourteenth aspect of the present disclosure, a method is specified for determining and displaying restrictions on the operation of an operating table having a patient support surface fastened on an operating table column. According to the method, restrictions on the operation of the operating table are determined based on at least the identification and/or configuration of the patient support surface. Furthermore, the determined restrictions are displayed by a display unit before the patient is placed on the patient support surface. Furthermore, the pieces of information about the restrictions can be used to automatically limit the movements of the entire patient support surface and/or the movements of the individual subsections of the support surface. In some embodiments, the pieces of information about restrictions of the table movement are displayed on the display before the patient lies on the table, and the restrictions are later automatically applied to the table when the patient is on the table, wherein the measured weight of the patient is taken into consideration.

The operating table system according to the thirteenth aspect and the method according to the fourteenth aspect can have all the configurations described in the present disclosure in connection with the system according to the twelfth aspect.

The present disclosure also comprises circuits and/or electronic instructions for controlling operating tables, as well as remote controls, displays, and user interfaces for use with operating tables.

BRIEF DESCRIPTION OF THE DRAWINGS

Exemplary embodiments of the present disclosure are explained in more detail below with reference to the figures. In the figures.

DETAILED DESCRIPTION OF THE FIGURES

In the following description, exemplary embodiments of the present disclosure are described with reference to the drawings. The drawings are not necessarily to scale, but are intended only to illustrate the respective features schematically.

It is to be noted that the features and components described below can each be combined with each other, regardless of whether they have been described in connection with a single embodiment. The combination of features in the respective embodiments serves merely to illustrate the basic structure and functioning of the claimed device.

In the figures, identical or similar elements are provided with identical reference symbols where appropriate.

Figure 1:
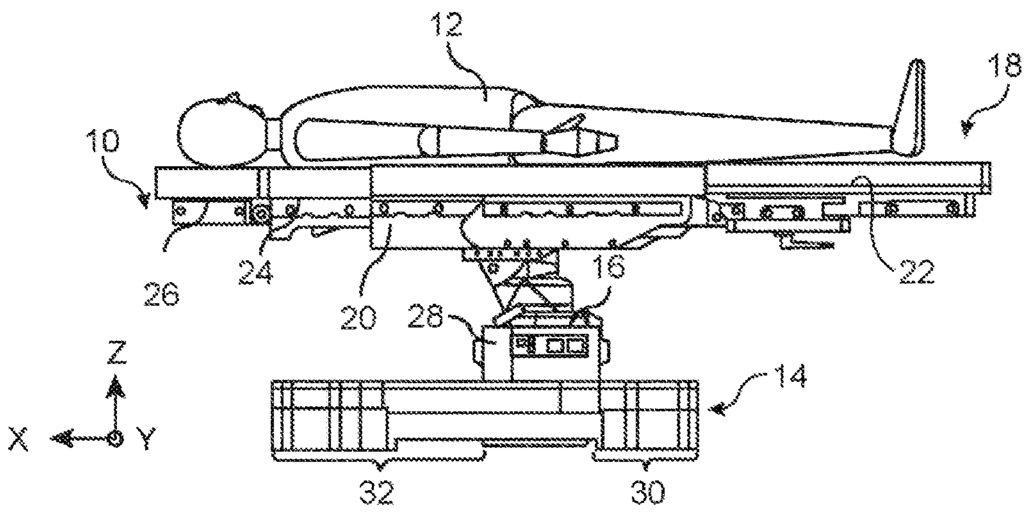
FIG. 1 shows a schematic side view of an operating table with a patient positioned on a patient support surface of the operating table.

FIG. 1 schematically shows a mobile operating table 10 which can be used for supporting a patient 12 during a surgical procedure and for transporting him. The mobile operating table 10 comprises, from bottom to top, a stand 14 for placing the operating table 10 on a surface, a vertically arranged operating table column 16 comprising the stand 14, and a patient support surface 18 fastened to an upper end of the operating table column 16. The patient support surface 18 can be fixedly connected to the operating table column 16 or, alternatively, can be detachably fastened to the operating table column 16.

The patient support surface 18 is modular and is used to support the patient 12. The patient support surface 18 comprises a main support surface section 20 connected to the operating table column 16, which can be extended as desired by coupling on various secondary support surface sections. In FIG. 1, a leg section 22, a shoulder section 24, and a head section 26 are coupled to the main support surface section 10 as secondary support surface sections.

The patient support surface 18 of the operating table 10 can be adjusted to a suitable height and can be both tilted and inclined depending on the type of surgical procedure to be performed.

The operating table column 16 is height-adjustable and has an internal mechanism for adjusting the height of the patient support surface 18 of the operating table 10. The mechanism is arranged in a housing 28, which protects the components from contamination.

The stand 14 has two sections 30, 32 of different lengths. The section 30 is a short section which is associated with a foot end of the leg section 22, i.e., the end of the patient support surface 18 on which the feet of the patient 12 to be treated lie. The section 32 is a long section which is associated with the head section 26 of the patient support surface 18.

Furthermore, the stand 14 can have wheels or rollers using which the operating table 10 can be moved on the floor. Alternatively, the stand 14 can be fixedly anchored on the ground.

For better illustration, a Cartesian coordinate system X-Y-Z is shown in FIG. 1. The X-axis and the Y-axis are the horizontal axes, the Z-axis is the vertical axis. The X-axis extends along the support surface sections 22, 24, 26 arranged adjacent to one another.

Figure 2:
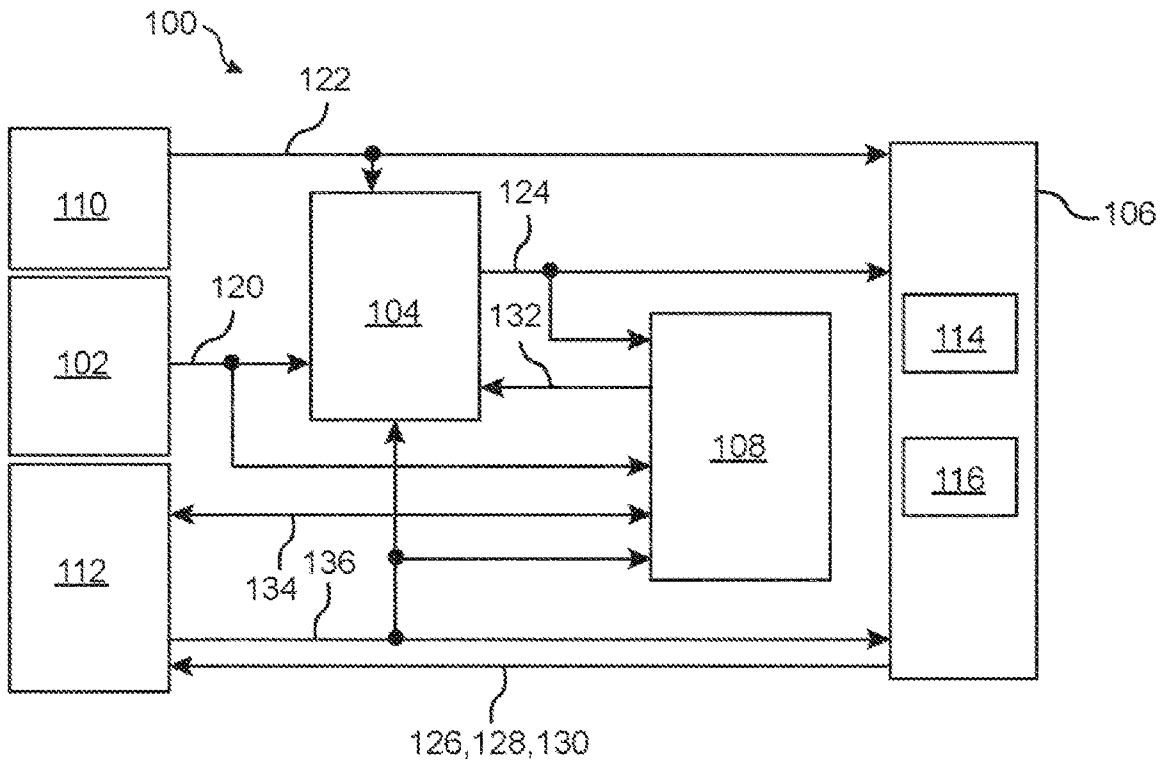
FIG. 2 shows a schematic representation of the system architecture of an operating table according to the disclosure having a load sensor arrangement, a load determination unit, and a safety unit.

FIG. 2 schematically shows the system architecture of an operating table 100 according to the disclosure. The operating table 100 has a load sensor arrangement 102, a load determination unit 104, a safety unit 106, a monitoring and calibration unit 108, a data storage 110, and other components 112 of the operating table 100. Furthermore, the safety unit 106 contains a tipping prevention unit 114 and an overload protection unit 116.

The load sensor arrangement 102 contains multiple load sensors and is designed to measure at least one variable from which a load acting on the load sensor arrangement 102 can be determined. In the present case, the load sensors are force sensors, each of which measures a force acting on the respective sensor. The force values measured by the individual force sensors are output by the load sensor arrangement 102 as a signal 120 in digital form. Furthermore, the load sensor arrangement 102 contains electronic components that are required to operate the force sensors.

The load determination unit 104 receives the signal 120 having the measured force values and determines therefrom a desired load and/or a load center of gravity. In detail, the load determination unit 104 can determine a measured load, an active load, and/or a total load as well as the associated load centers of gravity.

In order to be able to adequately process and analyze the supplied force values, the load determination unit 104 requires some data on the geometry and the masses or weights of the operating table 100 and the accessories. These data are stored in the data memory 110 and are made available to the load determination unit 104 by means of a signal 122. In particular, pieces of information on the masses and centers of gravity of the individual components of the operating table 100 and the accessories can be obtained from these data. The data memory 110 is expandable via a connectivity module of the operating table 100.

The load determination unit 104 generates a signal 124 as an output signal, which contains pieces of information about the determined loads and load centers of gravity. These pieces of information are transmitted to the safety unit 106, where all available data are analyzed, including the loads, centers of gravity, and position data of the operating table 100 and the accessories recognized by the operating table 100.

The safety unit 106 decides whether the operating table 100 is safe or whether it is in a dangerous situation. The safety unit 106 generates a safety signal 126 that indicates whether the operating table 100 is in a safety-critical state.

Depending on the severity of the recognized situation, the algorithm reacts accordingly. For example, the operating table 100 may only output a warning or stop the movement. The warnings can be given via an acoustic or optical signal by the operating table 100 or in the form of text via the remote control. The measures may vary from slowing down the speed of movement to stopping the movement to blocking some functionalities and may continue until a state is reached in which the operating table 100 is safe again.

It can be provided that the safety features can be deactivated by the user at any time and the movement of the operating table 100 can be continued at the user's own risk.

The tipping prevention unit 114 and the overload protection unit 116 are subunits of the safety unit 106. The tipping prevention unit 114 generates a tipping prevention signal 128 based on the total load and/or the center of gravity of the total load, indicating whether there is a risk of the operating table 100 tipping over. The overload protection unit 116 generates an overload protection signal 130 based on the defined load and/or the center of gravity of the defined load, which indicates whether there is a risk of overload for the operating table 100 and/or at least one component of the operating table 100. Alternatively, the overload protection unit 116 may use the measured load or the total load and/or the center of gravity of one of these loads to generate the overload protection signal 130. Both the tipping safety signal 128 and the overload protection signal 130 are safety signals of the safety unit 106.

If the stand 14 does not have wheels or rollers and is instead fixedly connected to the floor, the tipping prevention unit 114 may be deactivated or not implemented in the safety unit 106.

Since the system is designed to reliably recognize critical situations, the system also has a monitoring and calibration unit 108. This software module checks the plausibility of the measured values and recognizes whether the system is malfunctioning or whether calibration or taring of the system is necessary. The monitoring and calibration unit 108 generates corresponding output signals 132, 134, which are transmitted to the load determination unit 104 or the components 112 of the operating table 100.

The components 112 of the operating table 100 continuously generate position data, data for adjusting individual components, and pieces of information about the accessories recognized by the operating table 100. These data are made available to the system using a signal 136.

Figure 3:
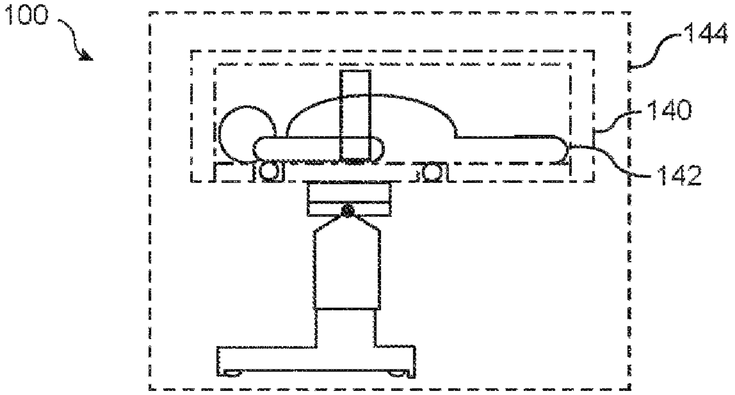
FIG. 3 shows a schematic representation of an operating table according to the disclosure to illustrate the measured load, the active load, and the total load.

FIG. 3 schematically illustrates the various loads that the load determination unit 104 can determine based on the data supplied by the load sensor unit 102. In FIG. 3, the measured load, the active load, and the total load are identified by reference numerals 140, 142, and 144, respectively.

The measured load is the load that acts on the load sensor arrangement 102. The measured load corresponds to the load generated by all persons, objects, and forces on the operating table 100 above the load sensors. The measured load corresponds to the load value measured by the load sensor arrangement 102.

The active load corresponds to the load caused by components not associated with the operating table 100, and persons and external forces, and which acts on the operating table 100. The influence of the components associated with the operating table 100 is not taken into consideration in the active load. Only the remaining components of the operating table 100 contribute to the active load, i.e., the components not associated with the operating table 100. These can be, for example, accessories that are not recognized by the operating table 100. Furthermore, the patient on the operating table 100 contributes to the active load. The active load also includes all external forces acting on the operating table 100, for example forces exerted on the operating table 100 by persons and/or objects outside the operating table 100. The active load is basically the measured load without the influence of the known objects such as table top parts, recognized accessories, etc.

The total load is the load resulting from the measured load and from a load caused by components associated with the operating table 100 and located below the load sensor arrangement 102. The total load therefore takes into consideration loads from components that are located below the load sensor arrangement 102 and cannot be measured by the load sensor arrangement 102 and therefore do not contribute to the measured load. The total load is therefore the load resulting from the entire operating table 100, the patient, the components associated with the operating table 100, the components not associated with the operating table 100, and other external forces.

Figure 4A:
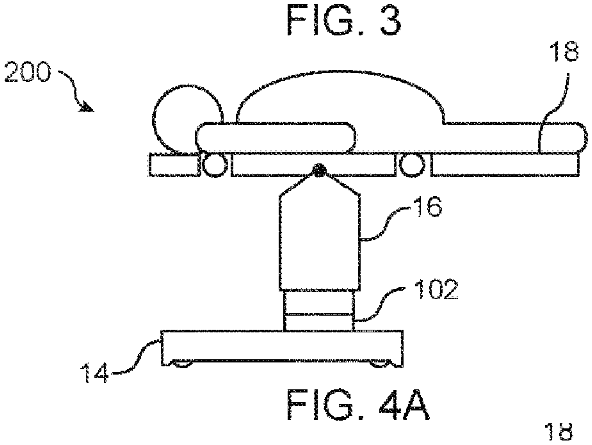
FIGS. 4A to 4C show schematic representations of various embodiments of an operating table according to the disclosure having a load sensor arrangement arranged between two parts that are not movable relative to one another.
Figure 4B:
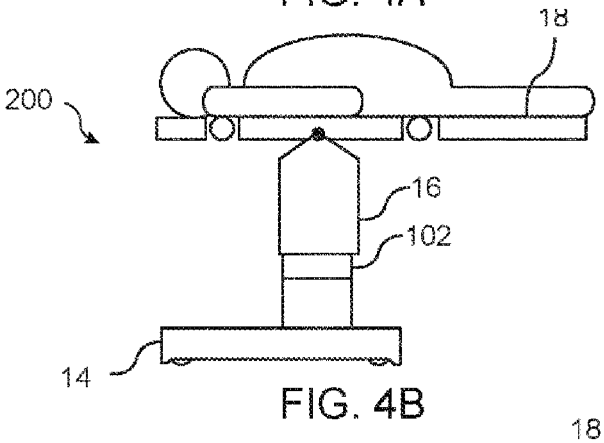
Figure 4C:
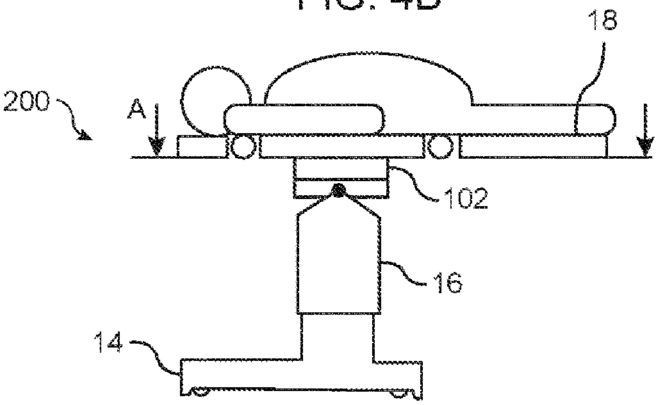

FIGS. 4A to 4C schematically show an operating table 200 according to the disclosure in various embodiments. The operating table 200 is in many respects similar to the operating table 100 schematically shown in FIG. 2. Elements of the operating table 200 that are identical or similar to elements of the operating table 100 are provided with identical reference numerals.

The operating table 200 is an operating table according to the first aspect of the present application and can be operated using a method according to the second aspect.

In the operating table 200, the load sensor arrangement 102 having the multiple load sensors is arranged between at least two parts of the operating table 200. The at least two parts are essentially immobile relative to one another. If the operating table 200, in particular the patient support surface 18, is moved or adjusted during operation, for example when tilting and/or extending the patient support surface 18, the at least two parts essentially do not move relative to one another, i.e., they remain essentially in the same position relative to one another. This applies both to the distance of the at least two parts from one another and to the angle(s) that the at least two parts enclose with one another.

The load sensor arrangement 102 is preferably integrated into the operating table 200 such that the entire load above the load sensors flows or is transmitted through the load sensor arrangement 102.

The load sensor arrangement 102 can be arranged at different positions in the operating table 200. In the embodiment shown in FIG. 4A, the load sensor arrangement 102 is arranged between the stand 14 and the operating table column 16, while the load sensor arrangement 102 in FIG. 4B is integrated into the operating table column 16. In FIG. 4C, the load sensor arrangement 102 is located adjacent to the interface between the patient support surface 18 and the operating table column 16.

Figure 5A:
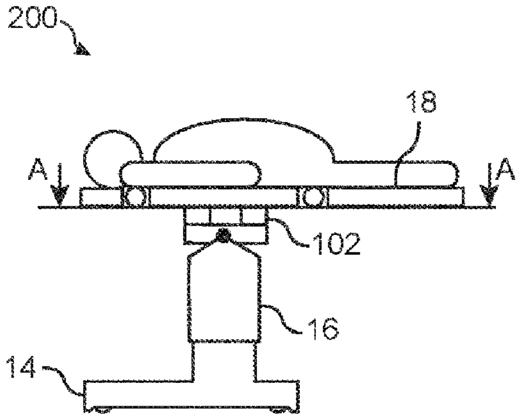
FIGS. 5A to 5D show schematic representations of various embodiments of an operating table according to the disclosure having force sensors arranged parallel and mirror-symmetrically.
Figure 5D:
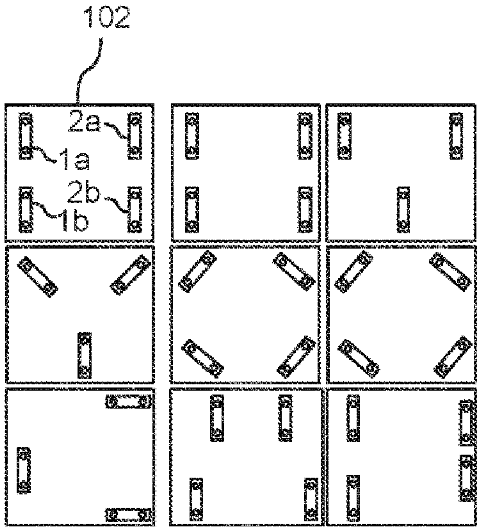
Figure 5B:
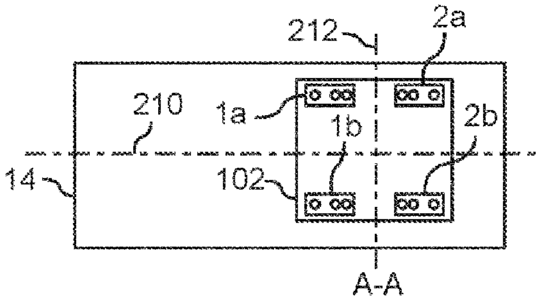
Figure 5C:
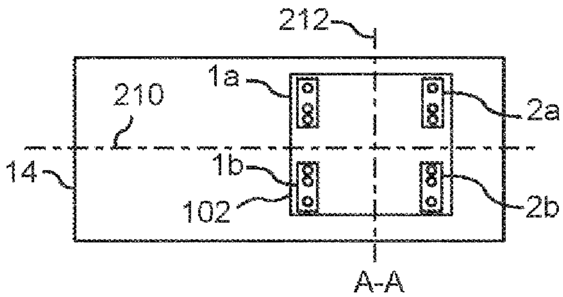

FIG. 5A shows the operating table 200 having a load sensor arrangement 102 arranged between the patient support surface 18 and the operating table column 16. The load sensor arrangement 102 contains four identical force sensors 1*a*, 1*b*, 2*a*, and 2*b*, which are arranged parallel and in a mirror image to one another. Two different variants for the placement of the force sensors 1*a*, 1*b*, 2*a*, 2*b* are illustrated in FIGS. 5B and 5C. FIGS. 5B and 5C each show a top view of the load sensor arrangement 102 along a line A-A shown in FIG. 5A.

For the alignment of the force sensors 1*a*, 1*b*, 2*a*, 2*c*, a first axis 210 and a second axis 212 are specified, which are perpendicular to one another. The first axis 210 extends parallel to a main axis of the patient support surface 18, while the second axis 212 extends perpendicular to this main axis but parallel to the patient support surface 18.

The force sensors 1*a*, 1*b*, 2*a*, 2*c* each have a main axis which is aligned parallel to the first axis 210 in FIG. 5B. In FIG. 5C, the main axes of the force sensors 1*a*, 1*b*, 2*a*, 2*b* are aligned parallel to the second axis 212. Furthermore, the force sensors 1a, 1b, 2a, 2b are each arranged in pairs mirror-symmetrically to the axes 210, 212. The pairs (1a, 1b), (1a, 2a), (1b, 2b), and (2a, 2b) each form a mirror-symmetric force sensor pair. In some embodiments, the force sensors 1a, 1b, 2a, 2b are arranged in a 2×2 grid as shown. In some embodiments, the grid arrangement has at least two force sensors 1a, 1b, 2a, 2b on each side. In some embodiments, the force sensors 1a, 1b, 2a, 2b all lie in a single common plane that is intersected by both the first axis 210 and the second axis 212.

The force sensors can also be arranged within the sensor arrangement 102 differently than in FIGS. 5B and 5C. Several exemplary alternative arrangements of the force sensors in the sensor assembly 102 are shown in FIG. 5D.

Figure 6A:
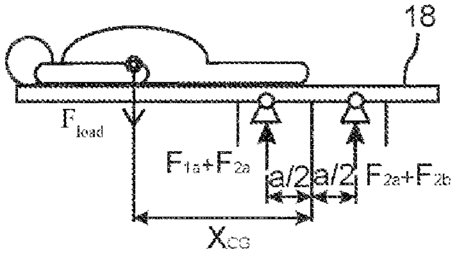
FIGS. 6A and 6B show schematic diagrams to illustrate the forces acting on the force sensors.
Figure 6B:
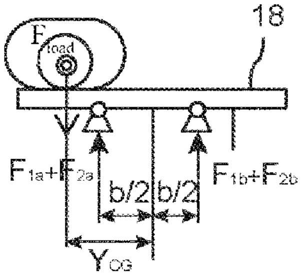

Using the example of the sensor arrangement 102 shown in FIG. 5B or 5C, the measured load can be calculated by adding all forces measured by the sensors 1a, 1b, 2a, 2b. The corresponding center of gravity can be calculated with the aid of the torque compensation equation below and the forces shown in FIGS. 6A and 6B. FIG. 6A shows a cross-sectional view along the x-axis and FIG. 6B shows a cross-sectional view along the y-axis. The torque balance equation can be applied in both directions so that the x and y components of the center of gravity can be determined:

$$F_{load} = F_{1a} + F_{2a} + F_{1b} + F_{2b} \quad (1)$$

$$X_{cg} = \frac{F_{1a} + F_{1b}}{F_{load}}a - \frac{a}{2} \quad (2)$$

$$Y_{cg} = \frac{F_{1a} + F_{2a}}{F_{load}}b - \frac{b}{2} \quad (3)$$

In equations (1) to (3), $F_{load}$ is the weight force generated by the patient. The forces $F_{1a}$, $F_{1b}$, $F_{2a}$, and $F_{2b}$ are the forces measured by the sensors 1a, 1b, 2a, 2b. The parameters a and b are the distances of the sensors in the x and y directions respectively. $X_{cg}$ and $Y_{cg}$ are the x and y coordinates, respectively, of the center of gravity of the load caused by the patient.

The active load and the total load as well as their corresponding center of gravity values can be calculated by adding or subtracting the corresponding components of the operating table 200 and their center of gravity values stored in the data memory 110.

Figure 7A:
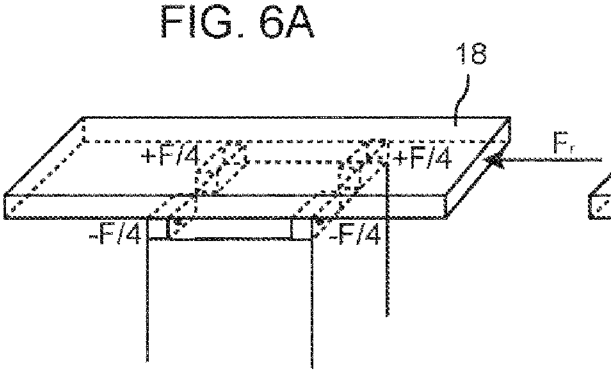
FIGS. 7A and 7B show schematic diagrams to illustrate the reduction of transverse forces due to the symmetrical arrangement of the force sensors.
Figure 7B:
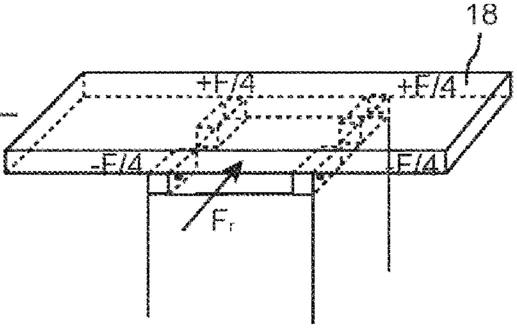

The arrangement of the sensors 1a, 1b, 2a, 2b proposed in FIGS. 5B and 5C makes the system robust against transverse forces. Due to the symmetrical arrangement, transverse forces are canceled, as shown in FIGS. 7A and 7B.

Figure 8:
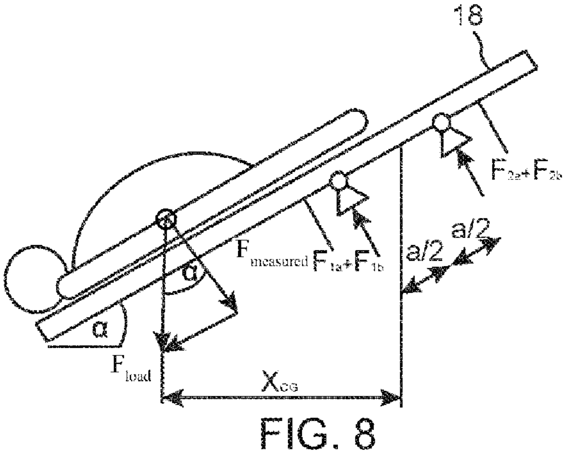
FIG. 8 shows a schematic representation to illustrate the determination of the gravitational vector for an inclined patient support surface.

The cancellation of the transverse forces also allows the described system to reliably measure forces and center of gravity when the patient support surface 18 is in an inclined position. FIG. 8 shows how the gravitational vector $F_{load}$ can be split into two components. One component is located lateral to the force sensors and is canceled due to the effects explained above. The second component $F_{measured}$ extends perpendicular to the force sensors and is reliably measured. If the inclination angle α of the patient support surface 18 is known, the actual load above the sensors and their center of gravity can be calculated.

Figure 9:
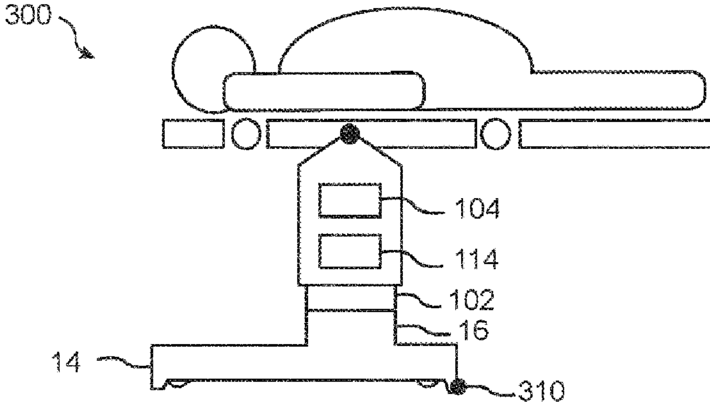
FIG. 9 shows a schematic representation of an operating table according to the disclosure having a load sensor arrangement, a load determination unit, and a tipping prevention unit.

FIG. 9 schematically shows an operating table 300 according to the disclosure, which is in many parts similar to the operating table 100 schematically shown in FIG. 2. Elements of the operating table 300 that are identical or similar to elements of the operating table 100 are provided with identical reference numerals.

The operating table 300 is an operating table according to the third aspect of the present application and can be operated using a method according to the fourth aspect.

The operating table 300 comprises a load sensor arrangement 102 having multiple load sensors, a load determination unit 104, and a tipping prevention unit 114. The load determination unit 104 determines the total load of the operating table 300 and the center of gravity of the total load based on the forces measured by the force sensors. The tipping prevention unit 114 generates a tipping prevention signal 128 based on the total load and/or the center of gravity of the total load, indicating whether there is a risk of the operating table 300 tipping over around a tipping point 310.

Figure 10A:
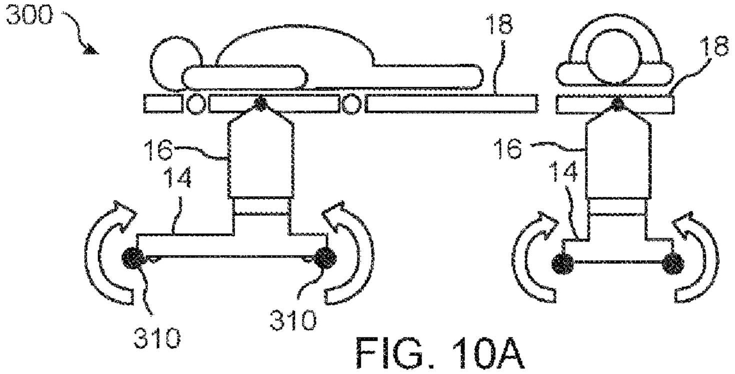
FIGS. 10A and 10B show schematic representations of an operating table according to the disclosure in a locked and unlocked position with tilting points, respectively.
Figure 10B:
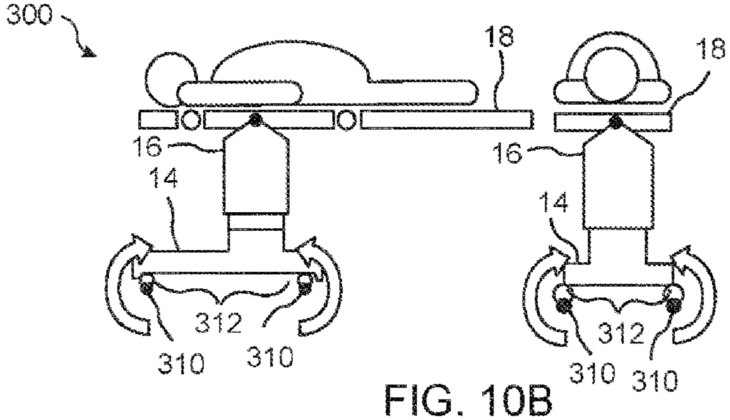

FIGS. 10A and 10B show the operating table 300 from the side and from the front, respectively. In FIG. 10A, the operating table 300 is in the lowered or locked position, i.e., the stand 14 rests on the floor so that the operating table 300 cannot be moved. In this position, the operating table 300 can tilt around the lower side edges of the stand 14, which face toward the floor.

In FIG. 10B, the operating table 300 is in the unlocked position, i.e., the operating table 300 stands on rollers 312 and can be moved on the floor. In this position, possible tipping points are provided by the rollers 312.

Figure 11A:
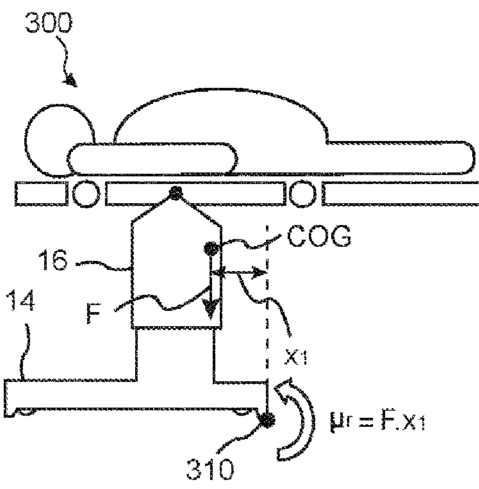
FIGS. 11A and 11B show schematic representations of an operating table according to the disclosure with a center of gravity of the total load inside and outside the contact surface of the tipping points, respectively.
Figure 11B:
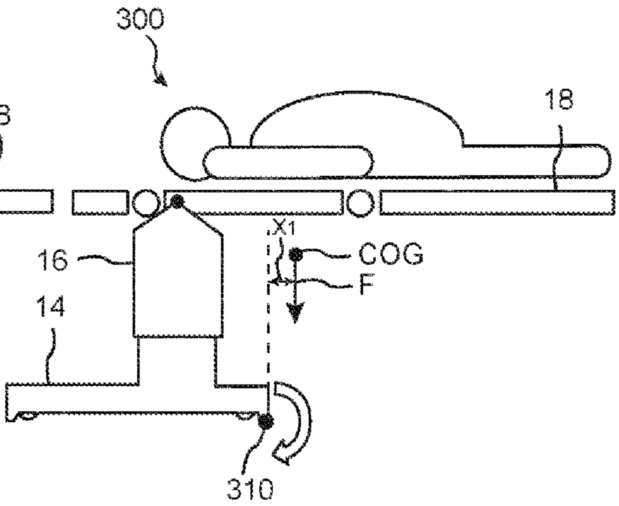

In principle, the operating table 300 is stable as long as the center of gravity COG of the total load lies within the footprint of the tipping points 310, i.e., directly above a surface delimited by the tipping points 310. This situation is illustrated in FIG. 11A. However, if the center of gravity COG of the total load is not directly above the footprint of the tipping points 310, as shown in FIG. 11B, the operating table 300 will tip over.

In one embodiment, the tipping prevention unit 114 ascertains a residual tipping torque $M_r$ at a tipping point 310 by multiplying the distance $x_1$ between the tipping point 310 and the center of gravity COG of the total load by the total load. In FIGS. 11A and 11B, a force vector F as the total load and also the distance $x_1$ between the force vector F and the tipping point 310 are shown. The residual tipping torque $M_r$ is therefore $M_r = F*X_1$. A positive value for the residual tipping torque $M_r$ means that the operating table 300 is stable with respect to this tipping point 310 (see FIG. 11A). As the distance $x_1$ decreases, the residual tipping torque $M_r$ also decreases and the operating table 300 becomes less stable. If the residual tipping torque $M_r$ is negative, which means that the center of gravity COG and the force vector F are not directly above the surface bounded by the tipping points 310, the operating table 300 tips over (cf. FIG. 11B). The greater the value of the residual tipping torque $M_r$, the more stable the operating table 300 is. A residual tipping torque threshold value is specified, which has a value of 225 Nm, for example. This means that the residual tipping torque is not to be less than 225 Nm. If the residual tipping torque threshold value is not reached, the operating table 300 can warn the user acoustically or visually. Other options are blocking movements or reducing the speed of the operating table 300.

Furthermore, the tipping prevention unit 114 can ascertain a respective residual tipping torque for all possible tipping points and compare each of these residual tipping torques to the residual tipping torque threshold value. If only one of the tipping torques falls below the residual tipping torque threshold value, the tipping prevention unit 114 can determine that there is an increased risk of tipping and appropriate measures can be taken.

A further embodiment for determining the risk of tipping is based on the stability requirements of norm 60601-1.

Figure 12:
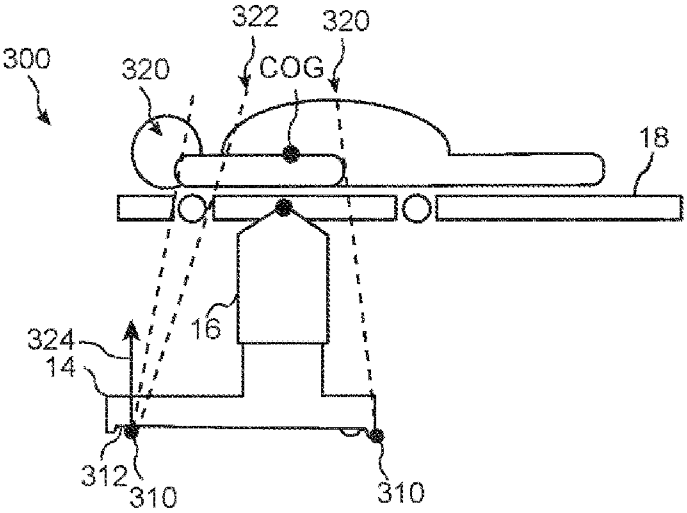
FIG. 12 shows a schematic representation of an operating table according to the disclosure with virtual 5 or 10 degree lines.

Norm 60601-1 stipulates that the operating table 300 has to remain stable at an inclination of 5 degrees under all circumstances of the intended use and that it has to remain stable at an inclination of 10 degrees only for the defined transport position. This requirement can be implemented in a virtual 5 degree line 320 at each tipping point and a 10 degree line 322 at each tipping point having a roller 312, as shown in FIG. 12. The angles of 5 and 10 degrees can be called stability angles. Therefore, in some embodiments, there is a first angle of stability when the operating table is placed directly on the floor and a second, larger angle of stability when the operating table is in a transport position on rollers or wheels.

The stability angles (of, for example, 5 or 10 degrees) are determined by means of a specified normal vector 324. The normal vector 324 can be defined, for example, by the base plate of the stand 14 or the patient support surface 18 in the normal position, i.e., in the non-extended position. The normal vector 324 is aligned perpendicular to the base plate of the stand 14 or perpendicular to the patient support surface 18 in the normal position. Instead of the 5 or 10 degree stability angle with the normal vector 324, other suitable stability angles can be selected for the virtual lines 320, 322.

If the center of gravity COG of the total load violates, i.e., passes through, one of the virtual 5 degree lines 320, the operating table 300 can warn the user acoustically or visually. Other possibilities are partially or completely blocking functionalities or reducing the speed of the operating table 300. If one of the virtual 10 degree lines 322 is exceeded by the center of gravity COG, the motorized transport function of the operating table 300 can be blocked.

The virtual 5 degree lines 320 and the virtual 10 degree lines 322 each define a three-dimensional space. Typically, the "walls" of the three-dimensional space incline inward as one moves further up from the base of the 300 operating table, so that the center of gravity COG is more strongly limited laterally at a higher center of gravity COG than at a lower, closer-to-ground center of gravity COG. The inward-directed inclination of the "walls" of the three-dimensional space is determined by the stability angle. In one embodiment, the tipping prevention unit 114 can display a tipping risk if the center of gravity COG of the total load leaves one of the defined spaces.

Figure 13:
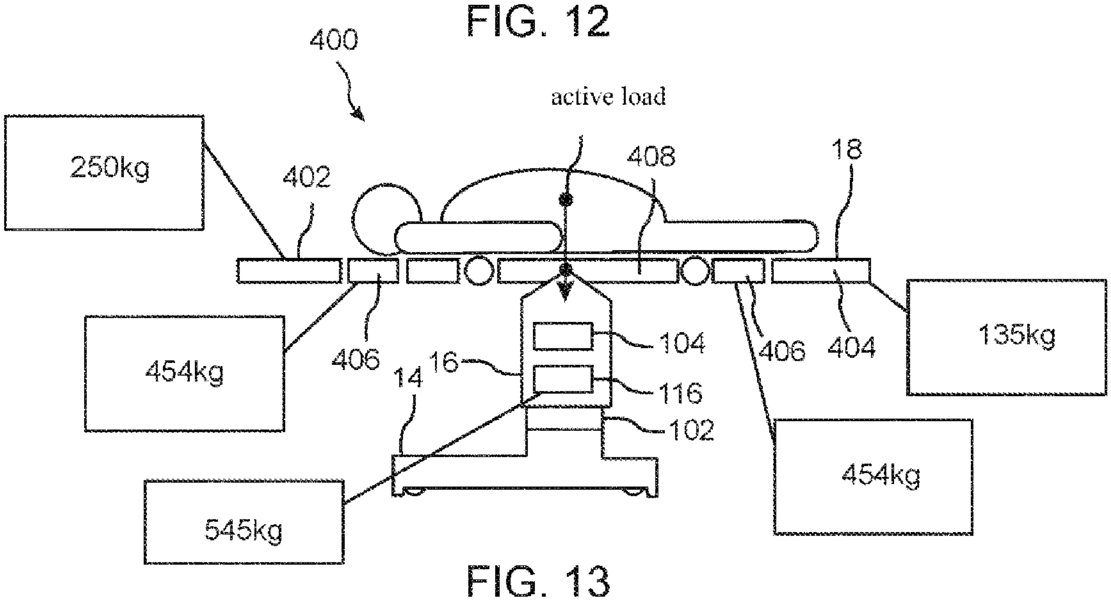
FIG. 13 shows a schematic representation of an operating table according to the disclosure having a load sensor arrangement, a load determination unit, and an overload prevention unit.

FIG. 13 schematically shows an operating table 400 according to the disclosure, which is in many parts similar to the operating table 100 schematically shown in FIG. 2. Elements of the operating table 400 that are identical or similar to elements of the operating table 100 are provided with identical reference numerals.

The operating table 400 is an operating table according to the fifth aspect of the present application and can be operated using a method according to the sixth aspect.

The operating table 400 comprises a load sensor arrangement 102 having multiple load sensors, a load determination unit 104, and an overload prevention unit 116. The load determination unit 104 determines the active load and/or the center of gravity of the active load based on the forces measured by the force sensors. The overload protection unit 116 determines an overload protection signal 130 based on the active load and/or the center of gravity of the active load. The overload protection signal 130 indicates whether there is a risk of overload for the operating table 400 and/or at least one component of the operating table 400.

The overload protection unit 116 can recognize whether an accessory or a configuration of accessories is not suitable for the load acting on the operating table 400. The overload protection unit 116 furthermore helps to maintain movement limits that apply to certain weight classes.

Accessories are usually approved for a patient weight. When a detection method is performed to recognize the accessories and the operating table 400 is thus informed of which accessories are attached, the overload protection unit 116 can check whether the measured weight does not exceed the weight limit for the accessory. If the weight limit of the operating table 400 or the accessory is exceeded, the operating table 400 can warn the user acoustically or visually. Other options are blocking movements or reducing the speed of the operating table 400.

The operating table 400 shown in FIG. 13 has as accessories a head section 402, a leg section 404, and two extension sections 406, which are connected to a main support surface section 408 in the configuration shown. For each of the accessories a maximum load capacity is indicated in FIG. 13. The head section 402 has a maximum load capacity of 250 kg, the leg section 404 has a maximum load capacity of 135 kg, each of the extension sections 406 has a maximum load capacity of 454 kg, and the entire operating table 400 has a maximum load capacity of 545 kg. The overload protection unit 116 can check whether one of the components is overloaded.

Figure 14:
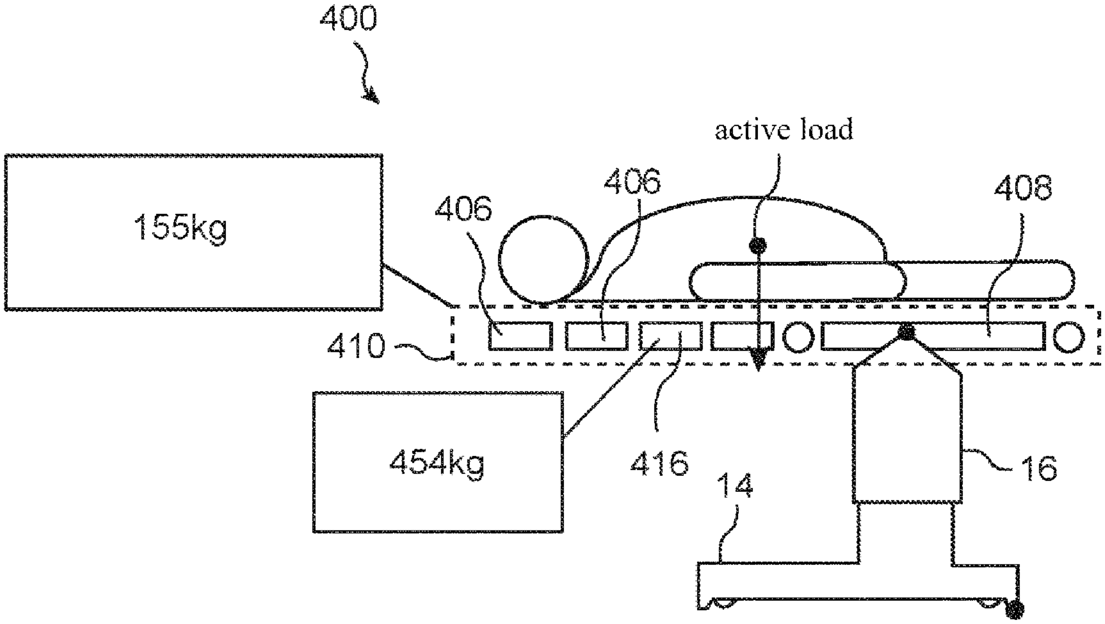
FIG. 14 shows a schematic representation of an operating table according to the disclosure having a configuration of extension sections.

The accessory can also be overloaded if the configuration in which the accessories are connected to one another is not suitable for the active load. For example, as shown in FIG. 14, three extension sections 406 can be cascaded one behind another. Although each of the extension sections 406 is individually suitable for a load of 454 kg, a combination 410 of three extension sections 406 is only suitable for 155 kg. Therefore, in some embodiments, the permissible weight for the table configuration is determined in consideration of a plurality of extension sections 406 connected to the operating table, wherein the addition of more extension sections 406 reduces the permissible weight for the overall table configuration in comparison to configurations having fewer extension sections 406.

Knowing the active load and the configuration of the operating table 400, the overload protection unit 116 can determine whether or not the permissible weight for the configuration 410 is exceeded. If the permissible weight is exceeded, the operating table 400 can warn the user acoustically or visually. Other options are blocking movements or reducing the speed of the operating table 400.

It is also conceivable that an overload situation is caused by incorrect positioning of the patient. For example, in FIG. 15A the case is shown that the patient is sitting on the head section 402 and the center of gravity of the entire patient is above the head section 402. Although the accessory 402 is suitable for use with patients weighing 380 kg, the accessory 402 is intended only as a headrest, i.e., sitting on it is not permitted.

The overload protection unit 116 can check the load and its center of gravity. The overload protection unit 116 can recognize whether the patient is incorrectly positioned and whether an accessory or configuration of accessories or the entire operating table 400 is overloaded.

Figure 15A:
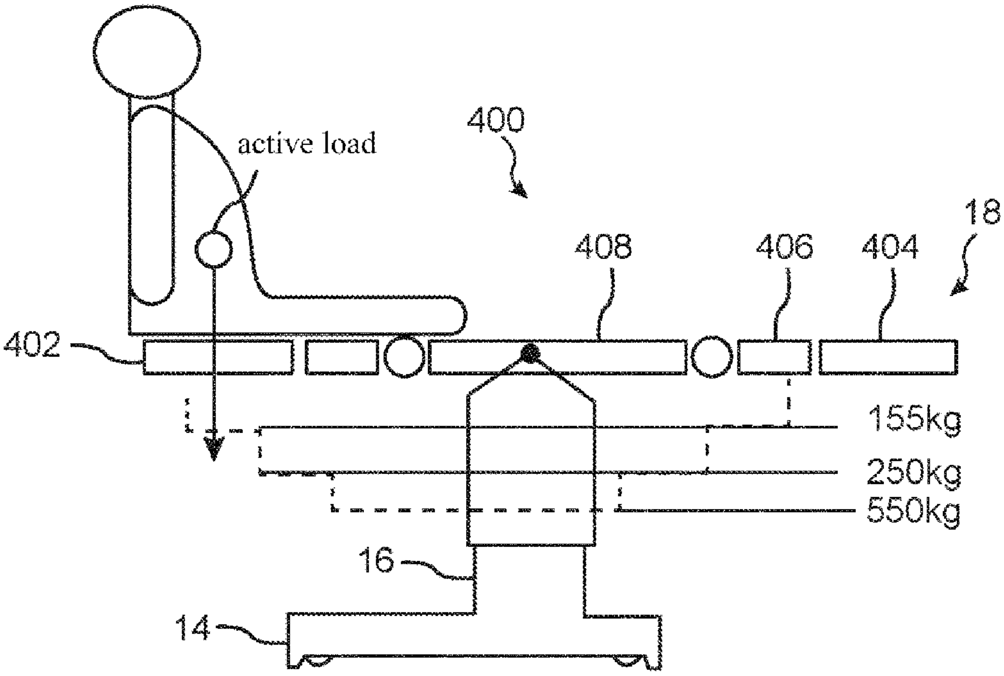
FIGS. 15A and 15B show schematic representations of an operating table according to the disclosure having different load limits in sections or points.

Furthermore, the overload protection unit 116 can also determine overload risks for certain sections or areas of the patient support surface 18. In FIG. 15A, the patient support surface 18 is divided by way of example into different areas for which maximum load capacities of 155 kg, 250 kg, and 55 kg apply. The overload protection unit 116 checks in which area the center of gravity of the active load is located and compares the active load to the overload threshold value specified for this area, i.e., the maximum load capacity. If the active load exceeds the maximum load capacity specified for this area, the overload protection unit 116 can generate the overload protection signal 130 such that it indicates a risk of overload.

Figure 15B:
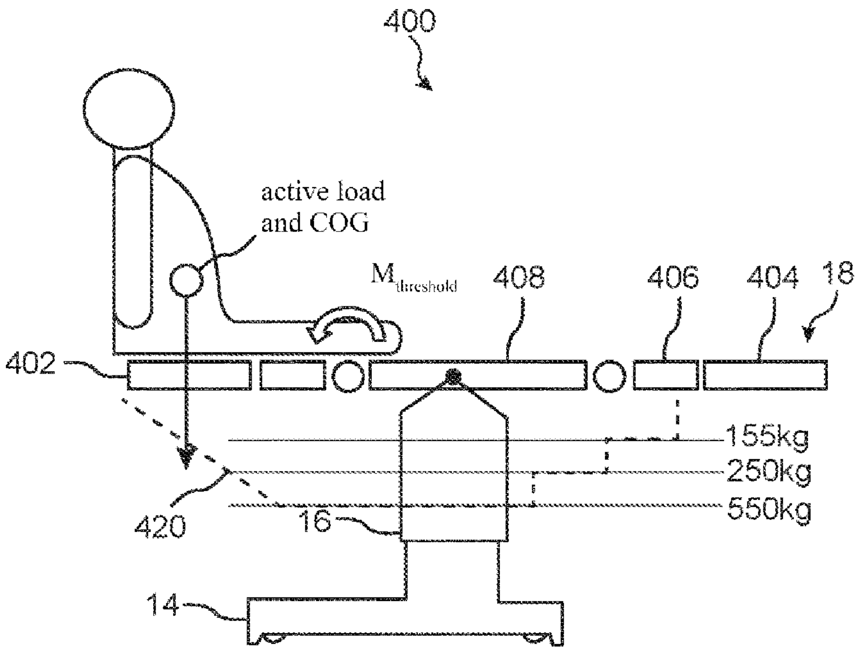

FIG. 15B shows a refinement of the operating table 400 shown in FIG. 15A. In the embodiment shown in FIG. 15B, the front part of the patient support surface 18 comprising the head section 402 is not divided into different regions, each with a constant overload threshold value; instead, a straight line 420 is provided which extends along the front part of the patient support surface 18. The straight line 420 specifies a respective overload threshold value for each point of the front part of the patient support surface 18. Towards the head end of the patient support surface 18, the overload threshold value becomes smaller. The line 420 is defined by $F/M_{threshold}$ value, wherein F is the force at the center of gravity COG of the active load and $M_{threshold}$ value is a constant.

During operation, the overload protection unit 116 checks at which point on the patient support surface 18 the center of gravity of the active load is located and compares the active load with the overload threshold value specified for this determined point. If the active load exceeds the maximum load capacity specified for this area, the overload protection unit 116 can generate the overload protection signal 130 such that it indicates a risk of overload.

Figure 16:
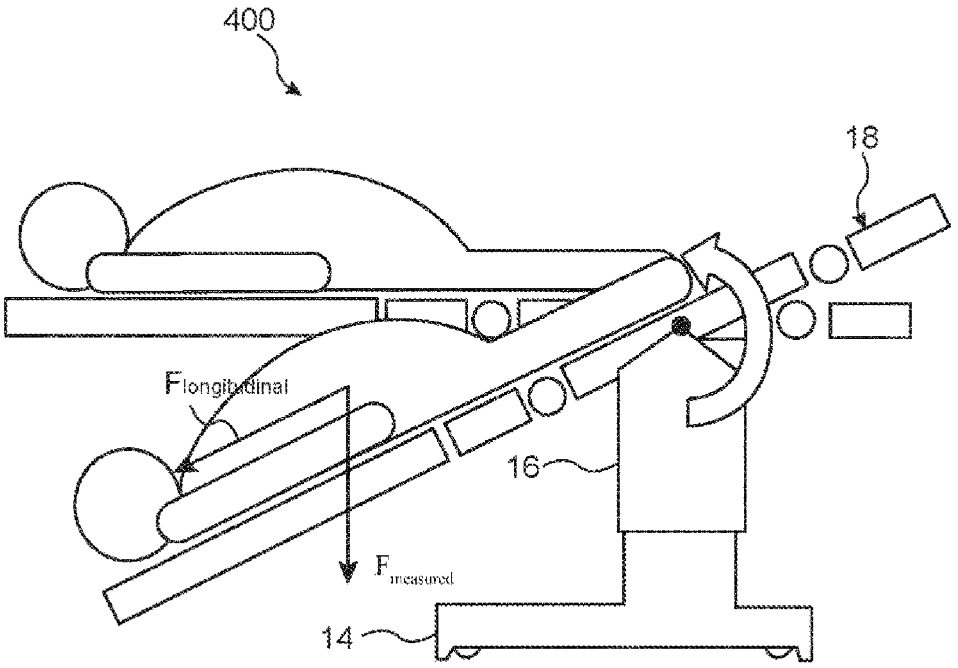
FIG. 16 shows a schematic representation of an operating table according to the disclosure in an extreme Trendelenburg position.

Another overload situation occurs when drives of the operating table 400 are overloaded and the operating table 400 cannot return to its original position. This happens, for example, when movement restrictions are not observed. As an example, FIG. 16 shows an extreme longitudinal displacement and Trendelenburg position in combination with a heavy patient. This may be a position from which the operating table 400 cannot return to its starting position because the drives for the longitudinal translation and the Trendelenburg drives are overloaded. In particular, the Trendelenburg drives cannot apply the torque generated by the force $F_{measured}$. In addition, the drives for longitudinal displacement cannot generate the longitudinal force $F_{longitudinal}$.

The overload protection unit 116 can ascertain the load of each drive based on the measured load and/or the center of gravity of the measured load. For each drive there is a load limit that is not to be exceeded. If this limit is exceeded, the user is warned. Other options are blocking movements of the overloaded drives or reducing the speed of the operating table 400.

Figure 17:
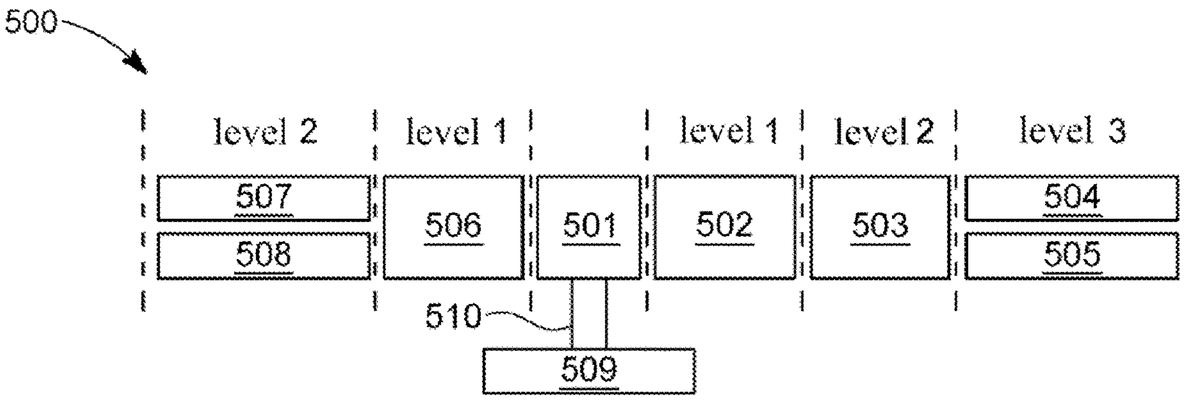
FIG. 17 shows a schematic side view of an operating table according to the disclosure having secondary support surface sections in different levels.

FIG. 17 schematically shows an operating table 500 having accessories or support surface sections arranged in different stages or levels. In the configuration shown in FIG. 17, the operating table 500 has levels 1, 2 and 3.

On the right side of a main support surface section 501, two intermediate sections 502, 503 are fastened one behind the other in levels 1 and 2, respectively. End sections 504, 505 are attached to the intermediate section 503 in level 3. On the left side of the main support surface section 501 there is an intermediate section 506 in level 1. On the side of the intermediate section 506 facing away from the main support surface section 501, end sections 507, 508 are fastened in level 2.

Furthermore, FIG. 17 shows a stand 509 for placing the operating table 500 on a surface and an operating table column 510 fastened to the stand 509, to the upper end of which the main support surface section 501 is fastened.

Figure 18:
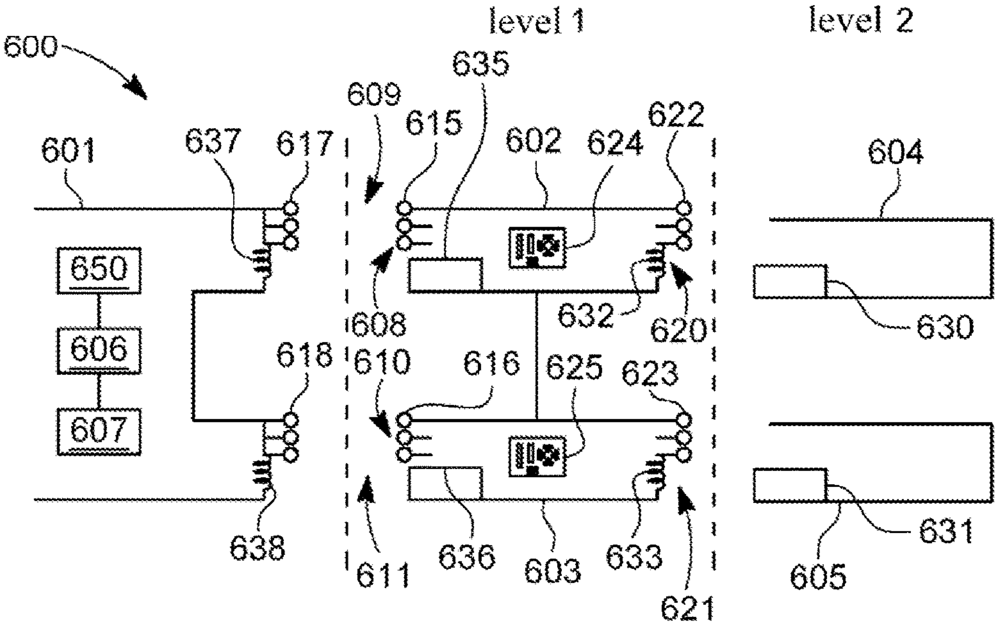
FIG. 18 shows a schematic representation of a patient support surface according to the disclosure having an interface designed for data transmission between the main support surface section and the intermediate sections.

FIG. 18 schematically shows a patient support surface 600 according to the disclosure, which can in particular be part of a system for determining and displaying restrictions on the operation of an operating table. The patient support surface 600 can, for example, be fastened to the operating table column 510 of the operating table 500 of FIG. 17. The patient support surface 600 consists of a main support surface section 601, two intermediate sections 602, 603, and two end sections 604, 605.

The patient support surface 600 is a patient support surface according to the seventh aspect and according to the twelfth aspect of the present application. The patient support surface 600 can be operated using a method according to the eleventh aspect or using a method according to the fourteenth aspect. Together with the stand 509 and the operating table column 501 from FIG. 17, the patient support surface 600 can form an operating table according to the eighth aspect or an operating table system according to the thirteenth aspect. The main support surface section 601 is a main support surface section according to the ninth aspect and the intermediate sections 602, 603 and the end sections 604, 605 are secondary support surface sections according to the tenth aspect of the present application.

The intermediate sections 602, 603 are directly connected to the main support surface section 601, while the end sections 604, 605 are each coupled to one of the intermediate sections 602, 603 and are thus indirectly connected to the main support surface section 601.

When the intermediate sections 602, 603 and the end sections 604, 605 are connected to the main support surface section 601, pieces of information are transmitted from the intermediate sections 602, 603 and the end sections 604, 605 to the main support surface section 601. The transmitted pieces of information indicate the nature or type of the respective secondary support surface section, i.e., the pieces of information indicate whether the respective secondary support surface section from which the transmitted information originates is, for example, a head, leg, or intermediate section.

The pieces of information received from the intermediate sections 602, 603 and the end sections 604, 605 are passed on to an evaluation unit 606 integrated in the main support surface section 601. Alternatively, the evaluation unit 606 can also be integrated into another component of the system. Based on the pieces of information, the evaluation unit 606 can determine which secondary support surface sections and in particular in which order or configuration the secondary support surface sections are connected to the main support surface section 601. The configuration of the patient support surface 600 can be displayed on a display 607 or generally a display unit. For example, the display 607 can be integrated into a remote control, a display screen on a wall, a display screen on a ceiling arm, the patient support surface 600, or another component of the operating table system.

The respective pieces of information are transmitted from the end sections 604, 605 via the respective intermediate sections 602 and 603 to the main support surface section 601. An interface 609 is located between the main support surface section 601 and a first side 608 of the intermediate section 602, which faces toward the main support surface section 601. Correspondingly, an interface 611 is located between the main support surface section 601 and a first side 610 of the intermediate section 603, which faces toward the main support surface section 601. The respective pieces of information are transmitted to the main support surface section 601 via the interfaces 609, 611 by means of electrical signals, e.g., current and/or voltage signals.

On their first sides 608, 610, the intermediate sections 602, 603 each have an electrical contact unit having contacts 615 and 616, respectively. Furthermore, the main support surface section 601 has electrical contact units having contacts 617 and 618, respectively, at the interfaces 609, 611. When the intermediate sections 602, 603 are connected to the main support surface section 601, the electrical contacts 615, 617 and the electrical contacts 616, 618 touch one another and each form an electrical contact which makes it possible to transmit the respective pieces of information to the main support surface section 601 by means of the electrical signals via the interface 609 or 611. Furthermore, the intermediate sections 602, 603 can be supplied with power from the main support surface section 601 via the described electrical contacts.

On the second sides 620, 621, which face away from the first sides 608 and 610, respectively, the intermediate sections 602, 603 each further have a further electrical contact unit having contacts 622 and 623, respectively. These electrical contact units make it possible to couple further intermediate sections (not shown in FIG. 18) to the intermediate sections 602, 603 and to supply the respective pieces of information from the further intermediate sections to the intermediate sections 602, 603 by means of electrical signals in order to then pass them on to the main support surface section 601. The other intermediate sections not shown in FIG. 18 can have the same structure as the intermediate sections 602, 603.

Furthermore, a control unit 624 or 625 is integrated into the intermediate sections 602, 603, which makes it possible to transmit the pieces of information to the main support surface section 601. Furthermore, the pieces of information about the intermediate section 602 or 603 can also be stored in the respective control unit 624, 625 or a storage unit connected thereto.

From the end sections 604, 605, the pieces of information concerning the end sections 604, 605 are transmitted to the intermediate sections 602 and 603, respectively, with the aid of radio signals. For this purpose, the end sections 604, 605 and the intermediate sections 602, 603 have respective radio transmission units. The radio transmission units are designed as RFID transponders 630 and 631 in the end sections 604, 605 and as RFID readers 632 and 633 in the intermediate sections 602, 603. The pieces of information concerning the end sections 604, 605 can be stored in the respective RFID transponder 630, 631 or a storage unit connected thereto.

In order to be compatible with components that do not have electrical contact units for wired transmission of pieces of information, the intermediate sections 602, 603 each contain an RFID transponder 635 or 636 at the interfaces 609, 610 and the main support surface section 601 contains corresponding RFID readers 637, 638. Thus, the pieces of information from the intermediate sections 602, 603 can also be transmitted to the main support surface section 601 by the RFID readers 637, 638 reading the respective information from the RFID transponders 635, 636.

For example, this disclosure comprises arrangements of the patient support surface 600 in which one or more intermediate sections 602, 603 each comprise one or more electrical contacts 615, 616, 622, 623, wherein each electrical contact 615, 616, 622, 623 can be arranged on two opposite sides of the intermediate sections 602, 603. This disclosure also comprises those arrangements of the patient support surface 600 in which one or more end sections 604, 605 can be connected to the one or more intermediate sections 602, 603, wherein each end section 604, 605 comprises a corresponding radio transmission unit 630, 631 for sending signals to the intermediate sections 602, 603, but wherein at least some of the end sections 604, 605 do not comprise electrical contacts.

In the above examples and with reference to FIG. 18, the end sections 604, 605 can be two separately movable leg supports, each having its own radio transmission unit 630, 631.

FIGS. 19A to 19D and 20A to 20D schematically show a patient support surface 700 according to the disclosure, which is a refinement of the patient support surfaces 600 shown in FIG. 18.

The patient support surface 700 has a main support surface section 701, two intermediate sections 702, 703, and an end section 704 in the form of a headrest. In FIGS. 19A to 19D, the patient support surface 700 is shown in the assembled state, while in FIGS. 20A to 20D, the support surface sections of the patient support surface 700 are separated from one another.

Figure 19A:
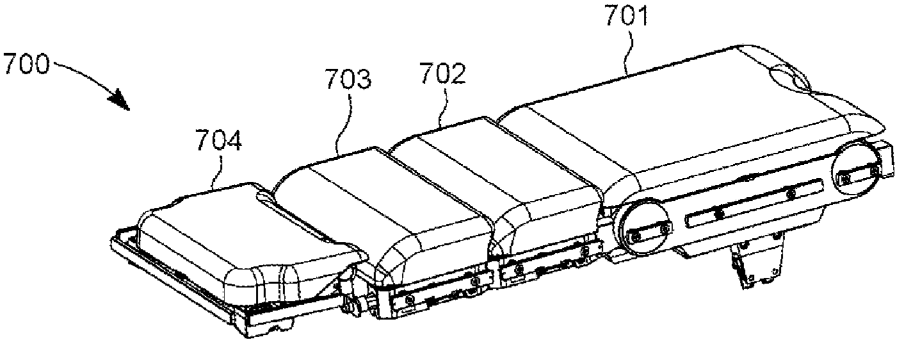
FIGS. 19A to 19D show schematic representations of a patient support surface according to the disclosure in the assembled state having male and female components for connecting the support surface sections.
Figure 19B:
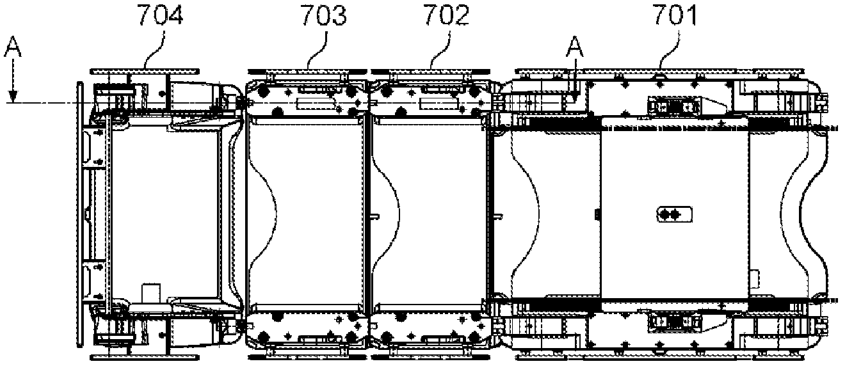
Figure 19C:
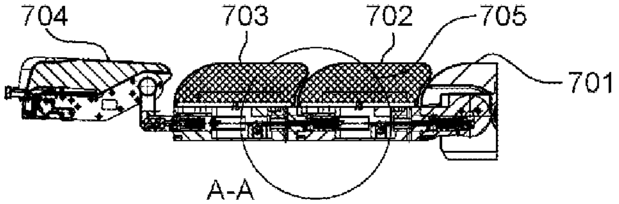
Figure 19D:
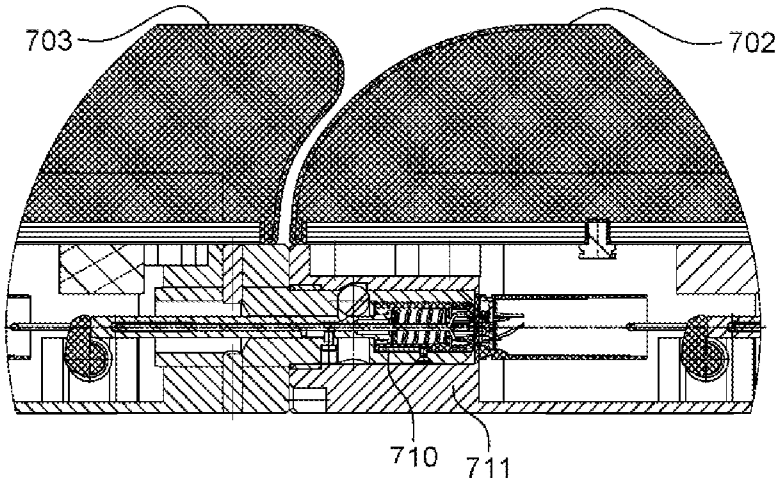
Figure 20A:
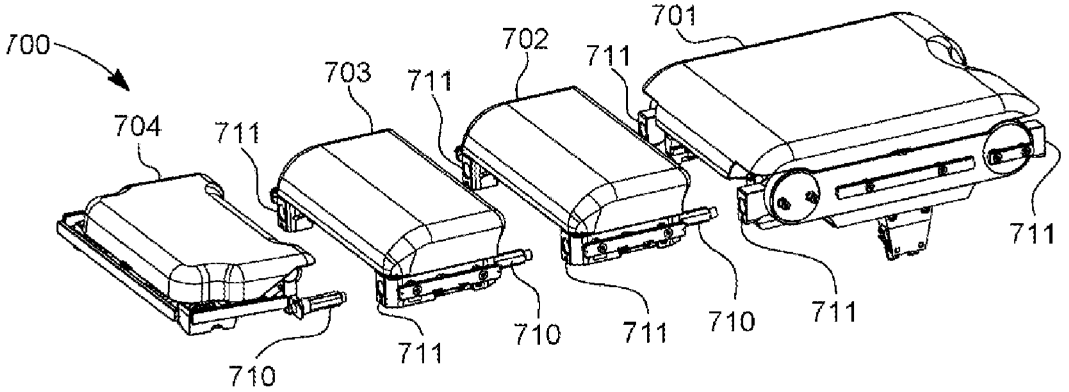
FIGS. 20A to 20D show schematic representations of the patient support surface shown in FIGS. 19A to 19D with separate support surface sections.
Figure 20B:
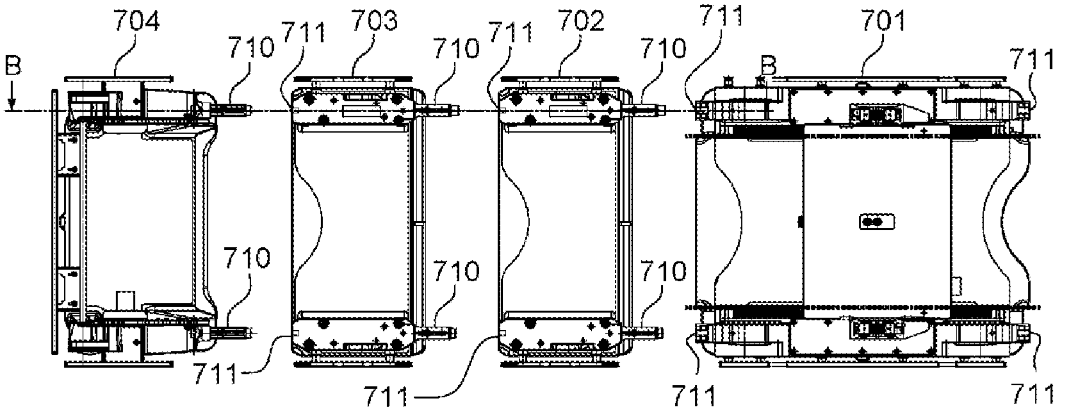
Figure 20C:
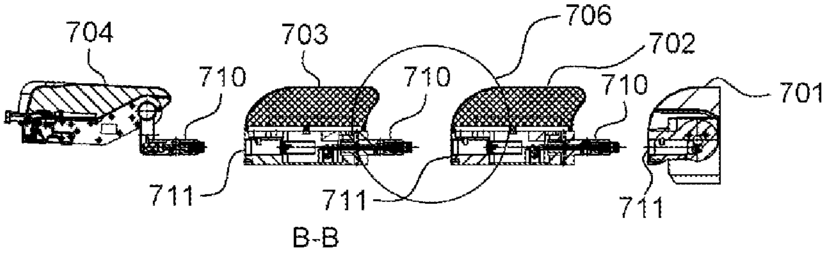
Figure 20D:
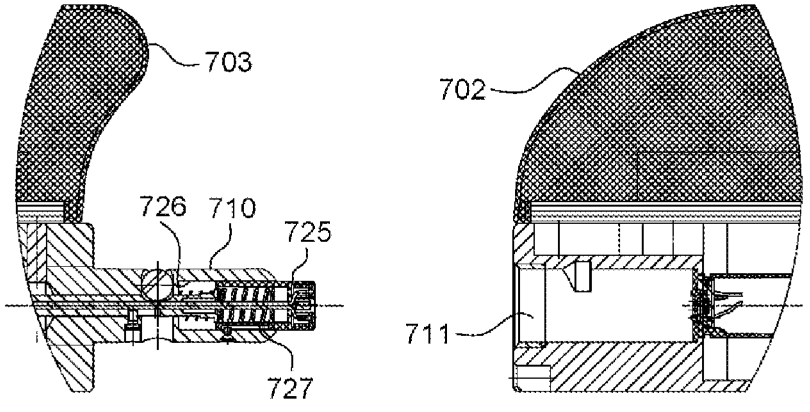

In FIGS. 19A and 20A, the patient support surface 700 is shown in perspective and in FIGS. 19B and 20B in a top view from below. FIGS. 19C and 20C show the patient support surface 700 in cross section along a line A-A or B-B shown in FIGS. 19B and 20B. FIGS. 19D and 20D show enlargements of details 705 and 706, respectively, which are marked in FIGS. 19C and 20C.

Connecting elements designed as male assemblies 710 or female assemblies 711 are used for the detachable mechanical connection of the support surface sections, wherein the male assemblies 710 fastened to one support surface section can be plugged into complementary receiving openings of the female assemblies 711 on another support surface section.

The main support surface section 701 has two female assemblies 711 on each of two opposite sides. The intermediate sections 702, 703 each have two male assemblies 710 on one side and two female assemblies 711 on the opposite side. The end section 704 includes two male assemblies 710 on one side. Generally speaking, one can imagine that the intermediate sections 702, 703 can have one or more male assemblies on a first side and one or more female assemblies on an opposite second side. The one or more male assemblies can be elongated, rigid, and/or weight-bearing structures.

The intermediate section 702 can be fastened on the main support surface section 701 by inserting the two male assemblies 710 arranged on one side of the intermediate section 702 into a pair of female assemblies 711 of the main support surface section 701. Similarly, the intermediate section 703 can be fastened on the intermediate section 702 and the end section 704 can be fastened on the intermediate section 703 by inserting the two respective male assemblies 710 into a pair of female assemblies 711.

Figure 21A:
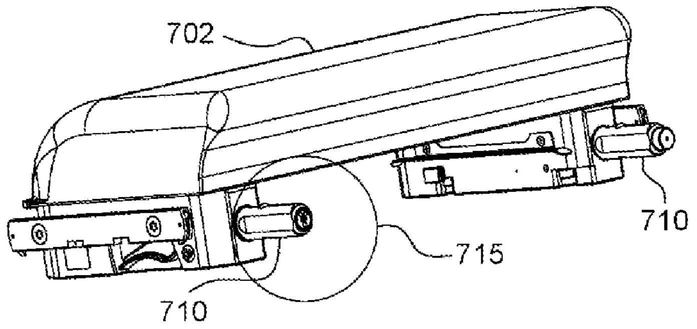
FIGS. 21A to 21D show schematic representations of male and female assemblies.
Figure 21B:
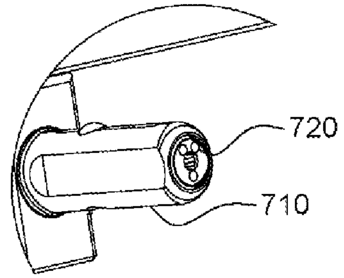
Figure 21C:
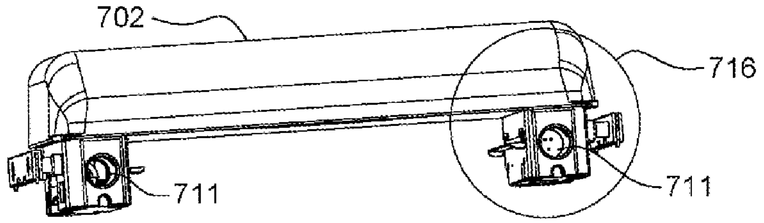
Figure 21D:
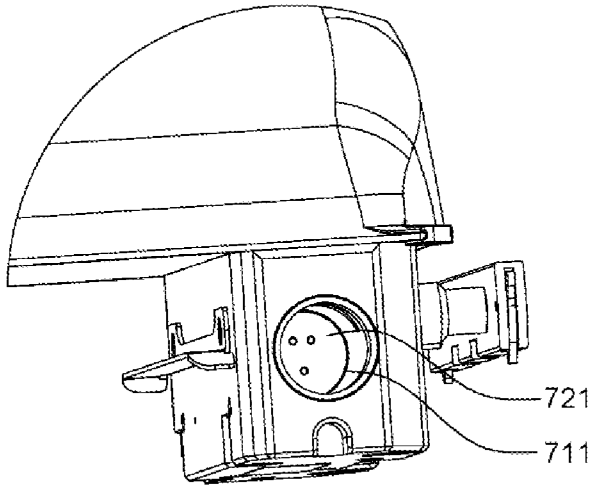

Details of the examples of the male and female assemblies 710, 711 are explained below with reference to FIGS. 21A to 21D, which show the intermediate section 702 as an example. FIG. 21A shows the intermediate section 702 in perspective in a view of the male assemblies 710. FIG. 21B shows an enlargement of a detail 715 marked in FIG. 21A. FIG. 21C shows the intermediate section 702 in perspective in a view of the female assemblies 711. FIG. 21D shows an enlargement of a detail 716 marked in FIG. 21C.

As shown in particular in FIG. 21B, the male assemblies 710 are elongated and have at their distal end three contacts 720 which belong to the electrical contact unit of the respective male assembly 710. Generally, the male assemblies 710 comprise one or more electrical contacts 720, which are preferably aligned so that they contact the corresponding contacts 721 in the female assembly 711 in the assembled state. Furthermore, the female assemblies 711 also comprise three contacts 721, which form the electrical contact unit of the respective female assembly 711. Generally, the female assemblies 711 comprise one or more electrical contacts 721, preferably on an inner surface, which are preferably oriented so they are in contact with the corresponding contacts 720 on the male assembly 710 in the assembled state. The contacts 720 and 721 are arranged such that the contacts 720, 721 touch one another when the corresponding male assembly 710 is plugged into the female assembly 711. Embodiments are also conceivable in which each interface has only one pair of male assemblies 710 and female assemblies 711 having electrical contacts 720, 721 and one or more additional pairs of male assemblies 710 and female assemblies 711 do not contain electrical contacts and have only a physical connection and/or support function.

In order to ensure reliable interface locking and in particular to establish an electrical connection between the contacts 720, 721, one or more contacts 720, 721 can be spring-loaded. For example, the contacts 720 of the male assembly 710 can be integrated into a spring-loaded cylinder 725 or into a spring-loaded sleeve. FIG. 20D shows the cylinder 725, at the right end of which the contacts 720 are located. The cylinder 725 is guided in a recess 726 of the male assembly 710. Furthermore, at least the left part of the cylinder 725 is hollow and a spring 727 is located in the cavity. The right end of the spring 727 is fastened or supported on the cylinder 727 and the left end is fastened or supported on the male assembly 710 or a component connected thereto. Due to the spring tension of the spring 727, the cylinder 725 is pressed out of the recess 726 in the unloaded state. The secure contact between the contacts 720, 721 is also implemented by the integration of three spring contact pins in the female assembly 711.

When the male assembly 710 is plugged into the corresponding female assembly 711, the spring 727 is compressed, as shown in FIG. 19D. The interaction of the spring 727 and a small spring in the recess 726 causes the locking bolt to be displaced and the locking ball to be pushed outwards.

It was described above in connection with FIG. 18 that the evaluation unit 606 of the patient support surface 600 shown in FIG. 18 can determine, based on the electrical signals transmitted via the interfaces 609 and 611, which secondary support surface sections are connected to the main support surface section 601 and in particular in which order or configuration the secondary support surface sections are arranged. The type of the secondary support surface sections connected to the main support surface section 601 and their configuration impose restrictions that have to or should be observed when operating the patient support surface 600. The restrictions can, for example, relate to the mobility of the patient support surface 600 and in particular to the adjustability and extendability of the secondary support surface sections. Depending on which secondary support surface sections and in which configuration these secondary support surface sections are connected to the main support surface section 601, other restrictions may arise regarding the adjustability and extendability of the secondary support surface sections.

Alternatively, the system can also be used to determine and warn of limitations for table systems in which the table parts are not interchangeable and do not need to be ascertained or determined for each procedure.

The evaluation unit 606 can generate pieces of information about restrictions on the operation of the patient support surface 600 based on the knowledge of which secondary support surface sections are connected to the main support surface section 601 and, if applicable, in which order. The display 607 can display the restrictions, for example, in text form and/or graphically.

The restrictions can also depend on the weight of the patient. If the weight of the patient is not known, the pieces information generated by the evaluation unit 606 may indicate the restrictions depending on the weight of the patient. For example, individual restrictions can be mentioned for different weight ranges.

If the weight of the patient and/or the load acting on the patient support surface 600 are known, the evaluation unit 606 can take this information into consideration to generate pieces of information in which the restrictions relate to the weight of the patient and/or the load acting on the patient support surface 600.

For example, the limitations or restrictions can include some or all of the following: longitudinal displacement of the entire patient support surface 600, Trendelenburg tilt of the entire patient support surface 600, lateral tilt of the entire patient support surface 600, movement of individual joints or secondary support surface sections 602 to 605 within the patient support surface 600; or restrictions or conditions can comprise determining that a specific configuration of the support surface sections 601 to 605 is not permitted for certain weight ranges or above a weight limit. The restrictions or conditions can also include determining that a certain type of movement is completely prohibited.

The patient support surface 600 shown in FIG. 18 has an input unit 650 into which the operator can enter the weight of a patient supported or to be supported on the patient support surface 600. The input unit 650 can, for example, be integrated into a remote control or another component of the system. Alternatively or additionally, a load determination unit can be integrated into the patient support surface 600 and/or the column or base of the associated operating table, which determines the load acting on the patient support surface 600 and in particular the weight of the patient supported on the patient support surface 600. For example, the load sensor arrangement 102 and the load determination unit 104 shown in FIG. 2 can be used for this purpose.

Figure 22:
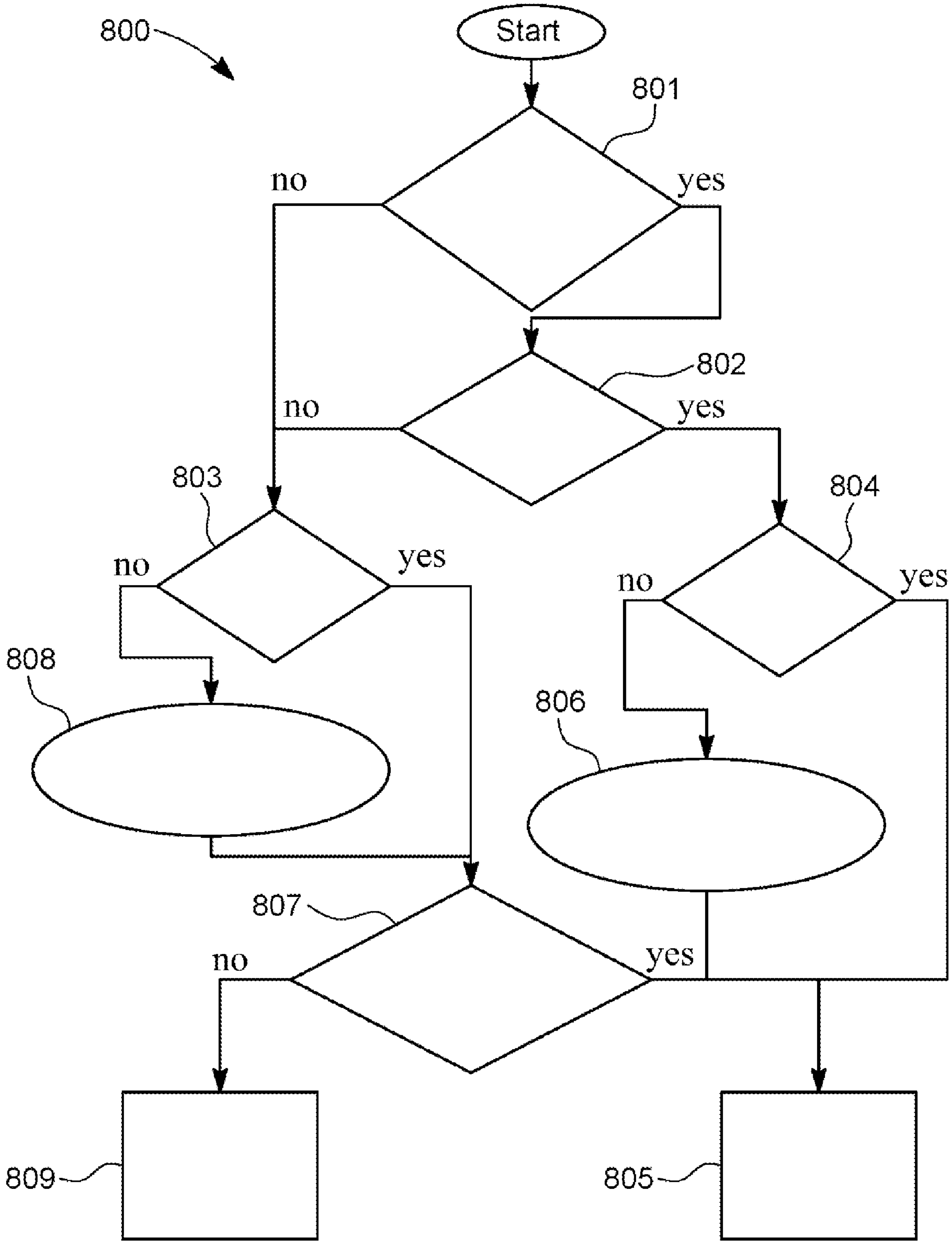
FIG. 22 shows a representation of a flow chart of a method according to the disclosure for generating information about restrictions on the operation of an operating table.

FIG. 22 shows a flow chart of a method 800 that the evaluation unit 606 can use to determine the pieces of information about the restrictions on the operation of the operating table.

After the method has started, it is queried in decision step 801 whether the operating table and/or the patient support surface 600 have a load determination unit, using which the load acting on the patient support surface 600 and in particular the weight of the patient can be determined. If this is the case, the method proceeds to decision step 802, otherwise to decision step 803.

In decision step 802, it is checked whether a patient is located on the patient support surface 600. If so, the method proceeds to decision step 804, otherwise to decision step 803.

Decision step 804 examines whether an evaluation unit is present which can detect the secondary support surface sections connected to the main support surface section 601. If such an evaluation unit is present, the method proceeds to step 805, otherwise to step 806.

In step 805, the evaluation unit 606 generates the pieces of information about restrictions on the operation of the patient support surface 600, which specifically relate to the ascertained weight of the patient and/or the load acting on the patient support surface 600. The display 607 can display these pieces of information.

In step 806, the user is prompted to specify the accessories used, in particular the secondary support surface sections connected to the main support surface section 601, for example by scanning. Thereafter, the method 800 proceeds to step 805.

In decision step 803, as in decision step 804, it is examined whether an evaluation unit is present which can detect the secondary support surface sections connected to the main support surface section 601. If yes, the method 800 proceeds to decision step 807, otherwise to step 808.

In decision step 807, it is checked whether the user has entered the patient weight into the input unit 650. If so, the method 800 proceeds to step 805, otherwise to step 809.

In step 809, the evaluation unit 606 generates the pieces of information about the restrictions on the operation of the patient support surface 600 for different weight ranges. The display 607 can display these pieces of information.

Step 808 corresponds to step 806, i.e., the user is asked to specify the accessories used, in particular the secondary support surface sections connected to the main support surface section 601. Thereafter, the method 800 proceeds to decision step 807.

Figure 23B:
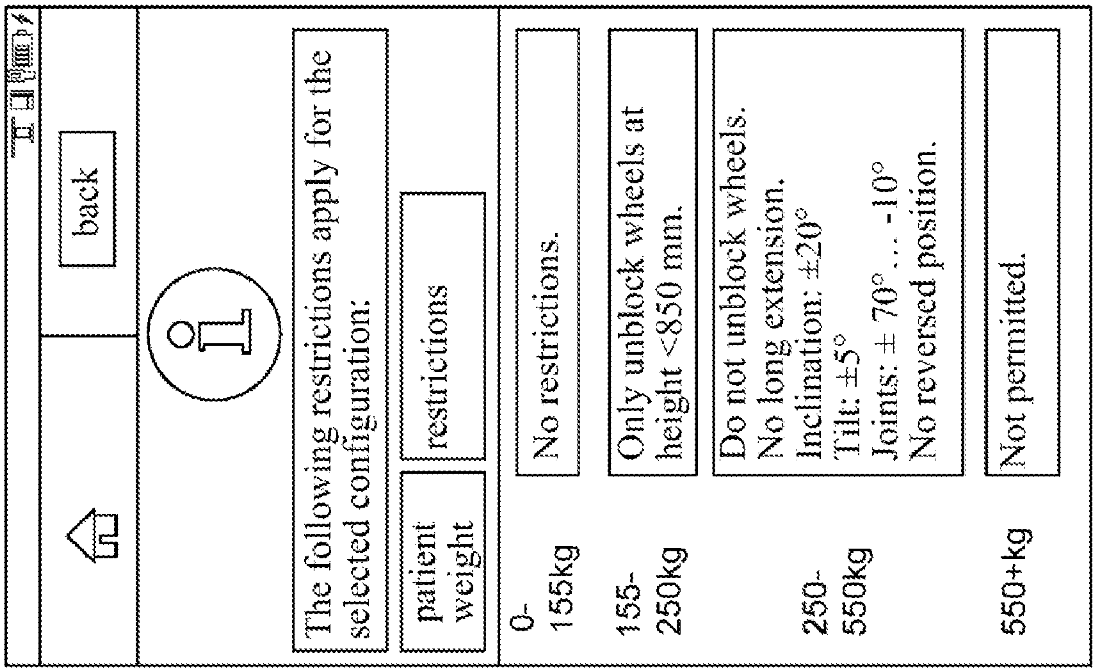
FIGS. 23A and 23B show representations of exemplary graphics displayed by a display.
Figure 23A:
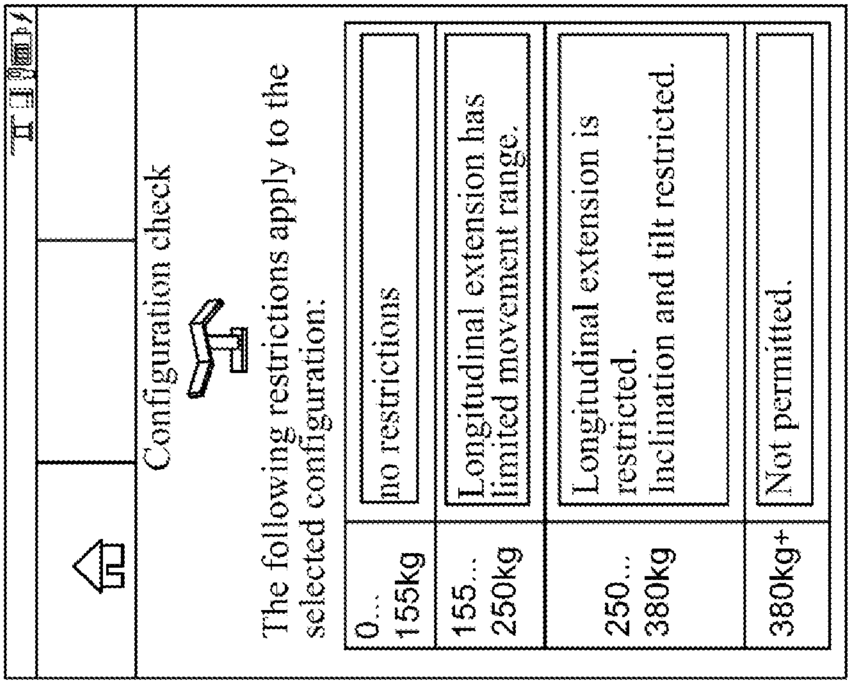

FIGS. 23A and 23B show exemplary graphics that the display 607 can display. The pieces of information displayed were generated in step 809 of the method 800 shown in FIG. 22 and indicate the restrictions on the operation of the patient support surface 600 for various ranges of the patient weight.

Figure 24:
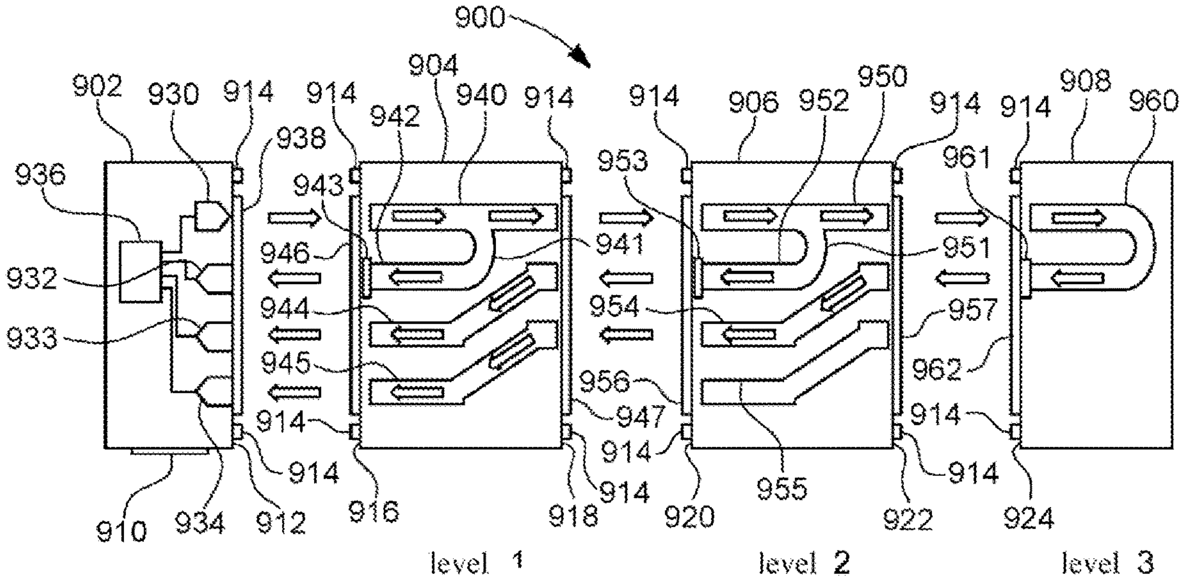
FIG. 24 shows a schematic representation of a patient support surface according to the disclosure having an interface designed for data transmission between the main support surface section and the intermediate sections.

While the patient support surface 600 shown in FIG. 18 uses electrical signals to transmit the pieces of information from the secondary support surface sections to the main support surface section 601, the patient support surface 900 according to the disclosure schematically shown in FIG. 24 uses optical signals instead of electrical signals to transmit information. The patient support surface 900 contains a main support surface section 902 and three secondary support surface sections 904, 906, 908 which are detachably connected to the main support surface section 902.

The secondary support surface sections 904, 906 are intermediate sections, and the secondary support surface section 908 is an end section.

The secondary support surface section 908 is arranged as an end section in a level 3, whereas the secondary support surface section 906 is arranged in a level 2 and the secondary support surface section 904 is arranged in a level 1. For example, the secondary support surface section 908 may be a head or leg section and the secondary support surface sections 904, 906 may be intermediate or extension sections, respectively.

In FIG. 24, only secondary support surface sections are shown, which are arranged on one side of the main support surface section 902. In addition, secondary support surface sections can also be arranged on another side of the main support surface section 902, which are not shown in FIG. 24.

The main support surface section 902 has an interface 910 on its lower side, using which the main support surface section 902 can be coupled to an operating table column.

Furthermore, the main support surface section 902 contains one or more connecting elements 914 on a lateral surface 912. The secondary support surface sections 904, 906 each also have one or more connecting elements 914 on two opposite lateral surfaces 916, 918 and 920, 922, respectively. The secondary support surface section 908 has one or more connecting elements 914 only on one lateral surface 924. The connecting elements 914 are designed such that they can mechanically connect the main support surface section 902 and the secondary support surface sections 904, 906, 908 to one another. Furthermore, the connecting elements 914 are designed to be detachable in order to be able to detach the mechanical connection between the main support surface section 902 and the secondary support surface sections 904, 906, 908 if necessary.

The main support surface section 902 contains a light source 930 that emits white light and three detector elements 932, 933, 934 that can detect light at least in the visible range. A control and evaluation unit 936 integrated in the main support surface section 902 is electrically coupled to the light source 930 and the detector elements 932, 933, 934. The control and evaluation unit 936 is used to control the light source 930 and the detector elements 932, 933, 934 and to evaluate the light detected by the detector elements 932, 933, 934. The detector elements 932, 933, 934 transmit electrical signals containing pieces of information about the detected light to the control and evaluation unit 936.

An interface 938 on the lateral surface 912 of the main support surface section 902 provides connections (not shown) for the light source 930 and the detector elements 932, 933, 934. The light source 930 and the detector elements 932, 933, 934 can be connected directly to the interface 938 or light guides can lead from the interface 938 to the light source 930 and the detector elements 932, 933, 934.

The secondary support surface section 904 includes a light guide 940 that leads from the lateral surface 916 to the lateral surface 918. A beam splitter 941 is integrated into the light guide 940, which couples light from the light guide 940 into a light guide 942. The light guide 942 leads to the lateral surface 916. Furthermore, an optical filter 943 designed as a marking element is arranged at the end of the light guide 942, which is designed such that it only allows light in the red spectral range to pass through. Furthermore, light guides 944, 945 lead from the lateral surface 918 to the lateral surface 916. Interfaces 946 and 947 are arranged on the lateral surfaces 916, 918, which each provide connections for the light guides 940, 942, 944, 945.

The secondary support surface section 906 is constructed similarly to the secondary support surface section 904. The secondary support surface section 906 includes a light guide 950 that leads from the lateral surface 920 to the lateral surface 922. A beam splitter 951 is integrated into the light guide 950, which couples light from the light guide 950 into a light guide 952. The light guide 952 leads to the lateral surface 920. Furthermore, an optical filter 953 designed as a marking element is arranged at the end of the light guide 952, which is designed such that it only allows light in the green spectral range to pass through. Furthermore, light guides 954, 955 lead from the lateral surface 922 to the lateral surface 920. Interfaces 956 and 957 are arranged on the lateral surfaces 920, 922, which each provide connections for the light guides 950, 952, 954, 955.

The secondary support surface section 908 contains a light guide 960 which couples an input located on the lateral surface 924 to an output likewise arranged on the lateral surface 924. Furthermore, an optical filter 961 designed as a marking element is arranged at the end of the light guide 960, which is designed such that it only allows light in the blue spectral range to pass through. An interface 962 which provides connections for the input and output of the light guide 960 is also arranged on the lateral surface 924.

When the main support surface section 902 and the secondary support surface sections 904, 906, 908 are fastened to one another via the connecting elements 914, the interfaces 938, 946 or 947, 956 or 957, 962 are each connected to one another in pairs. The interfaces 938, 946, 947, 956, 957, 962 are designed such that various components described below are coupled to one another.

In detail, the light source 930 is coupled to the light guides 940, 950, 960. The light guides 940, 950, 960 form a common light guide path which guides the white light generated by the light source 930 to the secondary support surface sections 904, 906, 908. Furthermore, the interfaces 938, 946, 947, 956, 957, 962 are designed such that the red light transmitted by the optical filter 943 is guided to the detector element 932, the green light transmitted by the optical filter 953 is guided to the detector element 933 via a separate light guide path formed by the light guide 944, and the blue light transmitted by the optical filter 961 is guided to the detector element 934 via a separate light guide path formed by the light guides 945, 954. The propagation direction of the light within the patient support surface 900 is shown by arrows in FIG. 24.

In operation of the patient support surface 900, the light source 930 generates white light, which is guided to the secondary support surface sections 904, 906, 908 through the common light guide path formed by the light guides 940, 950, 960. A part of the light is decoupled from the common light guide path by the beam splitters 941, 951 and guided to the optical filters 943, 953 arranged in the secondary support surface sections 904, 906. The part of the white light generated by the light source 930 remaining in the common light guide path is guided by the light guide 960 to the optical filter 961 arranged in the secondary support surface section 908.

The optical filters 943, 953, 961 only allow the respective spectral range to pass through. The red light transmitted by the optical filter 943 is guided to the detector element 932. The green light transmitted by the optical filter 953 is guided to the detector element 933. The blue light transmitted by the optical filter 961 is guided to the detector element 934.

The detector elements 932, 933, 934 detect the light transmitted by the respective optical filters 943, 953, 961 and transmit corresponding electrical signals to the control and evaluation unit 936.

The control and evaluation unit 936 carries out an evaluation of the received electrical signals and the pieces of information contained therein. Based on the red, green, or blue light detected by the detector elements 932, 933, 934, the control and evaluation unit 936 determines that the secondary support surface sections 904, 906, 908 are connected to the main support surface section 902. Since the detector elements 932, 933, 934 in this order have detected the red, green, and blue light, respectively, the control and evaluation unit 936 can additionally determine that the secondary support surface sections 904, 906, 908 are connected in this order to the main support surface section 902. The control and evaluation unit 936 can generate therefrom pieces of information about restrictions on the operation of the patient support surface 900 and pass on these pieces of information to a display which displays the pieces of information.

The various structures and functions described herein are intended for possible use together in particularly preferred embodiments. The structures and functions are considered to be disclosed in their various possible combinations and subcombinations. This disclosure comprises medical tables and operating tables, patient support surfaces and tabletops for medical use, systems including remote controls and display screens for use with operating tables and patient support surfaces, individual modular components (support surface sections) for forming portions of patient support surfaces, and methods for the use thereof. The disclosure also comprises various disclosed approaches for determining which components (support surface sections) are included in a patient support surface, each of which can be used with various approaches for determining patient weights, and each of which can be used to limit table movements, prevent tipping, prevent overloading, and/or display pieces of information to the operator regarding the limits of table movements.

The invention claimed is:

1. A system for determining and displaying restrictions on operation of an operating table, the system comprising:

a patient support surface comprising:

a main support surface section configured for connection to an operating table column of the operating table, and one or more removable secondary support surface sections configured for connection to the main support surface section;

an evaluation unit configured to:

detect which type or types of the one or more removable secondary support surface sections are connected to the main support surface section, detect an order of connection of the one or more removable secondary support surface sections relative to the main support surface section and relative to each of the one or more removable secondary support surface sections connected to the main support surface section, based on the detected order of connection of the one or more removable secondary support surface sections, determine a configuration of the patient support surface, based on the determined configuration of the patient support surface, determine one or more patient weight specific operating restrictions on operation of the operating table that apply according to a weight of a patient to be supported on the determined configuration of the patient support surface, and display the determined one or more patient weight specific operating restrictions on a display.

2. The system according to claim 1, wherein the one or more removable secondary support surface sections are configured to transmit signals to the main support surface section, and the detection of which type or types of the one or more removable secondary support surface sections are connected to the main support surface section, and the determination of the order of connection of the one or more removable secondary support surface sections relative to the main support surface section and relative to each of the one or more removable secondary support surface sections connected to the main support surface section, are based on the signals transmitted to the main support surface section.

3. The system according to claim 2, wherein the signals transmitted from the one or more removable secondary support surface sections to the main support surface section comprise electrical signals transmitted via a support surface interface between the one or more removable secondary support surface sections and the main support surface section.

4. The system according to claim 3, wherein the one or more removable secondary support surface sections comprises an intermediate secondary support surface section and an end secondary support surface section, the intermediate secondary support surface section being connected on a first side to the main support surface section and on a second side to the end secondary support surface section, and the electrical signals are transmitted from the end secondary support surface section to the intermediate secondary support surface section to the main support surface section.

5. The system according to claim 4, wherein the evaluation unit receives the electrical signals from the main support surface section, the detection of which type or types of the one or more removable secondary support surface sections are connected to the main support surface section comprises processing the electrical signals to identify the end secondary support surface section, and the determination of the order of connection of the one or more removable secondary support surface sections relative to the main support surface section and relative to each of the one or more removable secondary support surface sections connected to the main support surface section comprises processing the electrical signals to identify the order of connection of the intermediate secondary support surface section and the end secondary support surface section.

6. The system according to claim 4, wherein the intermediate support surface section comprises a control unit configured to transmit the electrical signals to the main support surface section.

7. The system according to claim 1, wherein the patient weight specific operating restrictions comprise a restriction on movement of at least a portion of the patient support surface that applies when the weight of the patient to be supported on the patient support surface meets or exceeds a threshold weight.

8. The system according to claim 7, wherein the movement of the patient support surface comprises:

movement of the patient support surface as a whole; or separate movement of one or more of the secondary support surface sections.

9. The system according to claim 1, wherein the patient weight specific operating restrictions comprise:

a first patient weight specific operating restriction that applies when the weight of the patient to be supported on the patient support surface falls within a first patient weight range; and a second patient weight specific operating restriction that applies when the weight of the patient to be supported on the patient support surface falls within a second patient weight range, the first patient weight specific operating restriction being different than the second patient weight specific operating restriction, and the first patient weight range being different than the second patient weight range.

10. The system according to claim 9, wherein the patient weight specific operating restrictions further comprise one or more additional patient weight specific operating restrictions that apply when the weight of the patient to be supported on the patient support surface falls within a respective additional patient weight range, the one or more additional patient weight specific operating restrictions being different from each other and different from the first and second patient weight specific operating restrictions, and each respective additional patient weight range being different than each other and different from the first and second patient weight ranges.

11. The system according to claim 1, further comprising:

an input unit configured to receive user input of the patient weight to be supported on the patient support surface; or an interface configured to receive electronic information of the patient weight from outside the system.

12. The system according to claim 11, wherein the determination of the one or more patient weight specific operating restrictions comprises the evaluation unit receiving and taking into consideration the user input of the patient weight or the electronic information of the patient weight.

13. The system according to claim 12, wherein the evaluation unit receives and takes into consideration the user input of the patient weight or the electronic information of the patient weight before the patient is supported on the patient support surface, and the patient weight specific operating restrictions comprise a restriction on movement of at least a portion of the patient support surface that applies based on the user input of the patient weight or the electronic information of the patient weight.

14. The system according to claim 11, wherein at least one of the display or the input unit comprises a remote control or a display screen that is physically separate from the patient support surface.

15. The system according to claim 1, wherein the patient weight specific restrictions on the operation of the operating table comprise one or more of:

restrictions on use of the one or more removable secondary support surface sections connected to the main support surface section, restrictions on the configuration of the one or more removable secondary support surface sections, restrictions on selection of axes around which movement of the one or more removable secondary support surface sections is possible, restrictions on a range within which the one or more removable secondary support surface sections can be moved around an axis, restrictions on a speed at which the one or more removable secondary support surface sections can be moved around an axis, restrictions on a maximum weight of the patient for the determined configuration of the patient support surface, restrictions on longitudinal displacement of the patient support surface, restrictions on Trendelenburg tilting of the patient support surface, restrictions on lateral tilting of the patient support surface, restrictions on height adjustment of the patient support surface, restrictions on extension of the rollers of the operating table, restrictions on motorized transport of the operating table, and/or restrictions on lateral displacement of the patient support surface.

16. The system according to claim 1, wherein the display comprises a remote control, a display screen on a wall, or a display screen on a ceiling arm, and wherein the patient weight specific restrictions on the operation of the operating table comprise restrictions on longitudinal displacement of the patient support surface, and/or restrictions on Trendelenburg tilting of the patient support surface.

17. The system according to claim 1, wherein the one or more removable secondary support surface sections comprises two or more removable secondary support surface sections that are connected to each other, and one of the two or more removable secondary support surface sections is connected to the main support surface section.

18. The system according to claim 1, wherein the determination of the one or more patient weight specific operating restrictions and displaying the determined one or more patient weight specific operating restrictions occurs when the operating table and/or the patient support surface are in a rest state in which the operating table and/or the patient support surface are not moving and when no signal or command to move the operating table and/or the patient support surface is pending.

19. An operating table, comprising:

the system according to claim 1; and an operating table column, the patient support surface of the system being connected to the operating table column.

20. The operating table according to claim 19, comprising:

a load sensor arrangement comprising multiple load sensors configured to measure at least one variable from which a load acting on the load sensor arrangement can be determined, the load sensor arrangement being arranged between at least two parts of the operating table that are essentially immobile relative to one another.

21. A method for determining and displaying restrictions on operation of an operating table comprising the system of claim 1, the method comprising:

detecting which type or types of the one or more removable secondary support surface sections are connected to the main support surface section;

detecting the order of connection of the one or more removable secondary support surface sections relative to the main support surface section and relative to each of the one or more removable secondary support surface sections connected to the main support surface section;

based on the detected order of connection of the one or more removable secondary support surface sections, determining the configuration of the patient support surface;

based on the determined configuration of the patient support surface, determining the one or more patient weight specific operating restrictions on operation of the operating table that apply according to the weight of the patient to be supported on the determined configuration of the patient support surface; and displaying the determined one or more patient weight specific operating restrictions on the display before the patient is placed on the patient support surface.

22. A system for determining and displaying restrictions on operation of an operating table, the system comprising:

a patient support surface configured for connection to an operating table column of an operating table, the patient support surface comprising:

a main support surface section having an interface configured for coupling to the operating table column, the main support surface section having at least one light source and at least one detector element, and one or more secondary support surface sections which are detachably connectable to the main support surface section, each of the one or more secondary support surface sections having one or more light guides and a marking element which changes light in a manner unique to the respective secondary support surface section, the one or more secondary support surface sections being configured to transmit signals to the main support surface section when connected to the main support surface section, the signals comprising light generated by the at least one light source and guided by means of the light guides to the marking elements of the one or more secondary support surface sections connected to the main support surface section and from the marking elements to the at least one detector element;

a display unit; and an evaluation unit configured to:

determine, based on the signals transmitted to the main support surface section, which type or types of secondary support surface sections are connected to the main support surface sections, determine the restrictions on operation of the operating table based on at least identification of the one or more secondary support surface sections or a configuration of the patient support surface determined from the signals, and display the restrictions on the display unit before the patient is placed on the patient support surface.

* * * * *